US012602883B2

(12) United States Patent
Belchee et al.

(10) Patent No.: US 12,602,883 B2
(45) Date of Patent: Apr. 14, 2026

(54) SYSTEMS AND METHODS FOR PROSPECTIVE ACTION DISPLAY AND EXECUTION THROUGH AUGMENTED REALITY

(71) Applicant: Wells Fargo Bank, N.A., San Francisco, CA (US)

(72) Inventors: William Blakely Belchee, San Francisco, CA (US); Brent Gentry Eveleth, San Francisco, CA (US); Amy Fistner, San Francisco, CA (US); Alexander Lyudin, San Francisco, CA (US); Alicia Jones-McFadden, San Francisco, CA (US); Aditi Rawat, San Francisco, CA (US); Reddy Chandan Sarjapur, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 124 days.

(21) Appl. No.: 18/600,415

(22) Filed: Mar. 8, 2024

(65) Prior Publication Data

US 2025/0285382 A1    Sep. 11, 2025

(51) Int. Cl.
*G06T 19/00*          (2011.01)
(52) U.S. Cl.
CPC .................................. *G06T 19/006* (2013.01)

(58) Field of Classification Search
CPC ... G06T 19/006; G06F 3/048; G06Q 30/0643; G06V 20/20
See application file for complete search history.

(56) References Cited

U.S. PATENT DOCUMENTS

| | | | | |
|---|---|---|---|---|
| 2012/0127284 A1* | 5/2012 | Bar-Zeev | .............. | G06T 19/006 348/158 |
| 2013/0178257 A1* | 7/2013 | Langseth | ................ | A63F 13/23 345/419 |
| 2019/0020809 A1* | 1/2019 | Pan | ........................ | H04L 12/282 |
| 2021/0056189 A1* | 2/2021 | Ganeshmani | ........... | G06F 21/31 |
| 2023/0152947 A1* | 5/2023 | Eirinberg | ................ | H04L 67/12 715/734 |

* cited by examiner

*Primary Examiner* — Jeffery A Brier
(74) *Attorney, Agent, or Firm* — Foley & Lardner LLP

(57)                ABSTRACT
A system includes a processing circuit. The processing circuit is configured to receive an indication of a log-in into a client application. The log-in causes a launching of an image capture graphical user interface. The client application is executed by a user device associated with a user. The processing circuit is also configured to acquire image data associated with an image and user data relating to the user. The image data is associated with an object depicted in the image. The processing circuit is also configured to determine, based on the image data, a prospective action associated with the object. The processing circuit is also configured to generate, based on comparing the prospective action to the user data, action data specific to the user for completing the prospective action. The processing circuit is also configured to augment the image capture graphical user interface by including the action data.

20 Claims, 17 Drawing Sheets

320

322
Provide an indication of a log-in into a client application associated with a provider institution 324
Launch an image capture graphical user interface 326
Provide image data associated with an image depicting at least one object and user data relating to a user to an image processing system of the provider institution 328
Receive an augmentation to the image capture graphical user interface that includes action data specific to the user for satisfying at least one action requirement to complete a prospective action associated with the at least one object

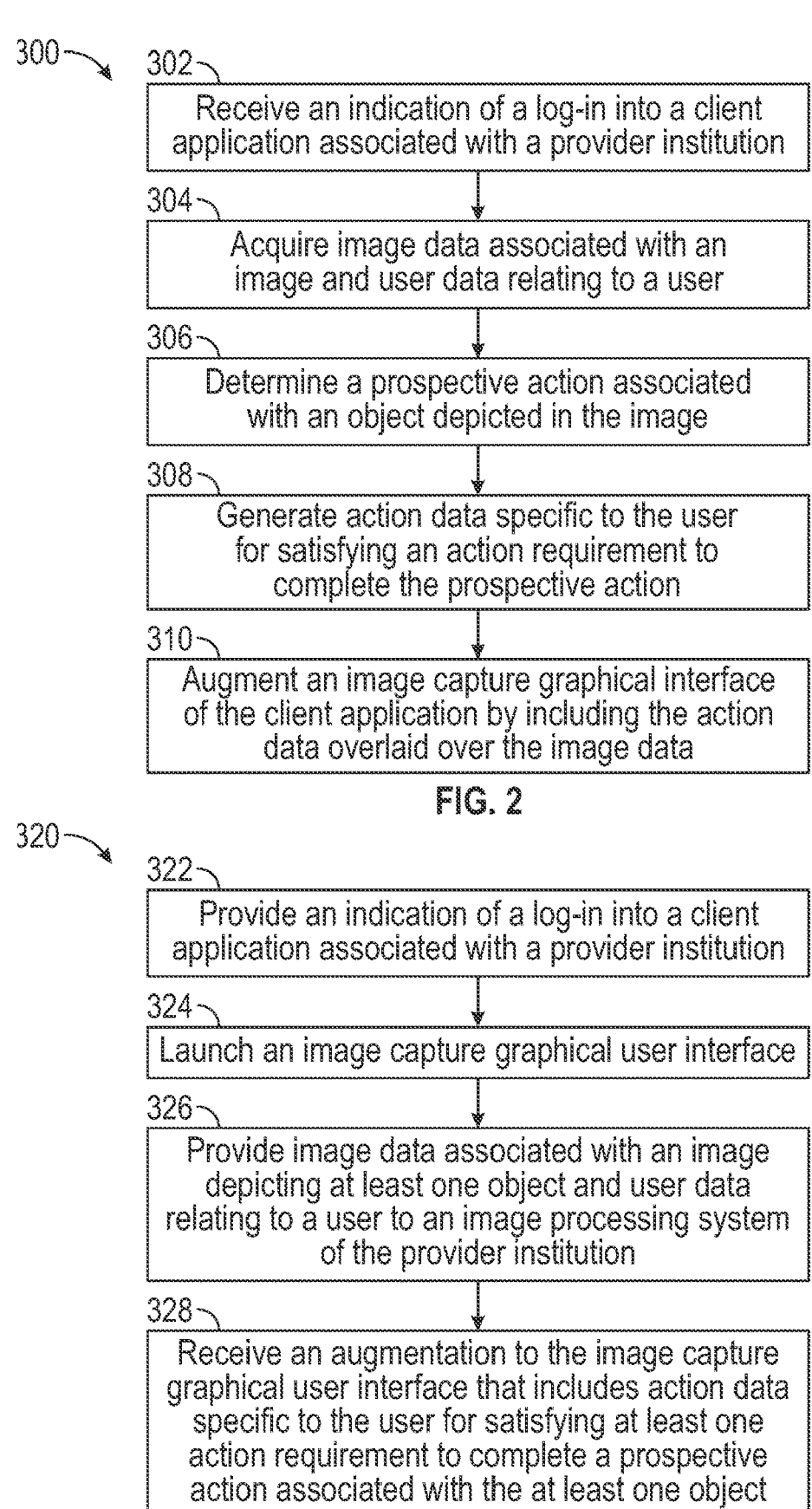

300

302
Receive an indication of a log-in into a client application associated with a provider institution 304
Acquire image data associated with an image and user data relating to a user 306
Determine a prospective action associated with an object depicted in the image 308
Generate action data specific to the user for satisfying an action requirement to complete the prospective action 310
Augment an image capture graphical interface of the client application by including the action data overlaid over the image data

322
Provide an indication of a log-in into a client application associated with a provider institution 324
Launch an image capture graphical user interface 326
Provide image data associated with an image depicting at least one object and user data relating to a user to an image processing system of the provider institution 328
Receive an augmentation to the image capture graphical user interface that includes action data specific to the user for satisfying at least one action requirement to complete a prospective action associated with the at least one object

FIG. 3

SYSTEMS AND METHODS FOR PROSPECTIVE ACTION DISPLAY AND EXECUTION THROUGH AUGMENTED REALITY

TECHNICAL FIELD

The present disclosure relates generally to the field of augmented reality, including displaying and executing prospective actions for users corresponding to objects depicted in images through augmented reality.

BACKGROUND

When looking at an object, people typically have difficulty visualizing prospective actions associated with the object due to the complicated combinations of payment instruments, brokers, or merchants for the object, and/or a combination thereof. Additionally, when people use image processing systems to analyze images depicting the objects, the image processing systems do not perform augmentations on the static images that are associated with the objects depicted in the images.

SUMMARY

Some arrangements relate to a system. In some arrangements, the system includes at least one processing circuit. In some arrangements, the at least one processing circuit includes at least one memory storing instructions therein that are executable by at least one processor. In some arrangements, the at least one processing circuit is configured to receive an indication of a log-in into a client application associated with the provider institution. In some arrangements, the log-in causes a launching of an image capture graphical user interface. In some arrangements, the client application is executed by a user device associated with a user. In some arrangements, the at least one processing circuit is also configured to acquire image data associated with an image obtained by an image acquisition device of the user device via the image capture graphical user interface of the client application and user data relating to the user associated with the user device. In some arrangements, the user data is stored by the client application and the image data is associated with at least one object depicted in the image. In some arrangements, the at least one processing circuit is also configured to determine, based on the image data, a prospective action associated with the at least one object. In some arrangements, the prospective action includes at least one action requirement related to completing the prospective action. In some arrangements, the at least one processing circuit is further configured to generate, based on comparing the at least one action requirement to the user data, action data specific to the user for satisfying the at least one action requirement to complete the prospective action. In some arrangements, the at least one processing circuit is further configured to augment the image capture graphical user interface by including the action data. In some arrangements, augmenting the image capture graphical user interface overlays the action data specific to the user over the image data including the at least one object to provide simultaneous viewing of the at least one object with the action data specific to the user. For example, the augmentation of the image capture graphical user interface may provide an augmented reality to the user, where the action data is overlaid over the image depicting surroundings of the user (e.g., a reality of the user, physical objects proximate the user, an environment surrounding the user, etc.). As such, the user may visualize the action data overlaid over the surroundings of the user in the image capture graphical user interface and may make decisions associated with the objects depicted in the image of the surroundings of the user based on the augmentation of the image with the action data.

Some arrangements relate to a method. In some arrangements, the method includes receiving, by at least one processing circuit, an indication of a log-in into a client application associated with a provider institution. In some arrangements, the log-in causes a launching of an image capture graphical user interface. In some arrangements, the client application is executed by a user device associated with a user. In some arrangements, the method also includes acquiring image data associated with an image obtained by an image acquisition device of the user device via the image capture graphical user interface of the client application and user data relating to the user associated with the user device. In some arrangements, the user data is stored by the client application and the image data is associated with at least one object depicted in the image. In some arrangements, the method also includes determining, based on the image data, a prospective action associated with the at least one object. In some arrangements, the prospective action includes at least one action requirement related to completing the prospective action. In some arrangements, the method also includes generating, based on comparing the at least one action requirement to the user data, action data specific to the user for satisfying the at least one action requirement to complete the prospective action. In some arrangements, the method also includes augmenting the image capture graphical user interface by including the action data. In some arrangements, augmenting the image capture graphical user interface overlays the action data specific to the user over the image data including the at least one object to provide simultaneous viewing of the at least one object with the action data specific to the user.

Some arrangements relate to a computer-readable storage medium (CRM) having instructions stored thereon that, when executed by at least one processing circuit, cause the at least one processing circuit to perform operations. In some arrangements, the operations include receiving an indication of a log-in into a client application associated with a provider institution. In some arrangements, the log-in causes a launching of an image capture graphical user interface. In some arrangements, the client application is executed by a user device associated with a user. In some arrangements, the operations also include acquiring image data associated with an image obtained by an image acquisition device of the user device via the image capture graphical user interface of the client application and user data relating to the user associated with the user device. In some arrangements, the user data is stored by the client application and the image data is associated with at least one object depicted in the image. In some arrangements, the operations also include determining, based on the image data, a prospective action associated with the at least one object. In some arrangements, the prospective action includes at least one action requirement related to completing the prospective action. In some arrangements, the operations also include generating, based on comparing the at least one action requirement to the user data, action data specific to the user for satisfying the at least one action requirement to complete the prospective action. In some arrangements, the operations also include augmenting the image capture graphical user interface by including the action data. In some arrangements, augmenting the image capture graphical user interface over-lays the action data specific to the user over the image data including the at least one object to provide simultaneous viewing of the at least one object with the action data specific to the user.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements. Numerous specific details are provided to impart a thorough understanding of embodiments of the subject matter of the present disclosure. The described features of the subject matter of the present disclosure may be combined in any suitable manner in one or more embodiments and/or imple-mentations. In this regard, one or more features of an aspect of the invention may be combined with one or more features of a different aspect of the invention. Moreover, additional features may be recognized in certain embodiments and/or implementations that may not be present in all embodiments or implementations.

BRIEF DESCRIPTION OF THE DRAWINGS

FIG. 2 is a flow diagram of a method for augmenting an image capture graphical user interface to overlay action data specific to a user over image data associated with an image obtained by an image acquisition device of a user device, according to example embodiments.

FIG. 3 is a flow diagram of a method for displaying an image capture graphical user interface, according to example embodiments.

DETAILED DESCRIPTION

Figure 1:
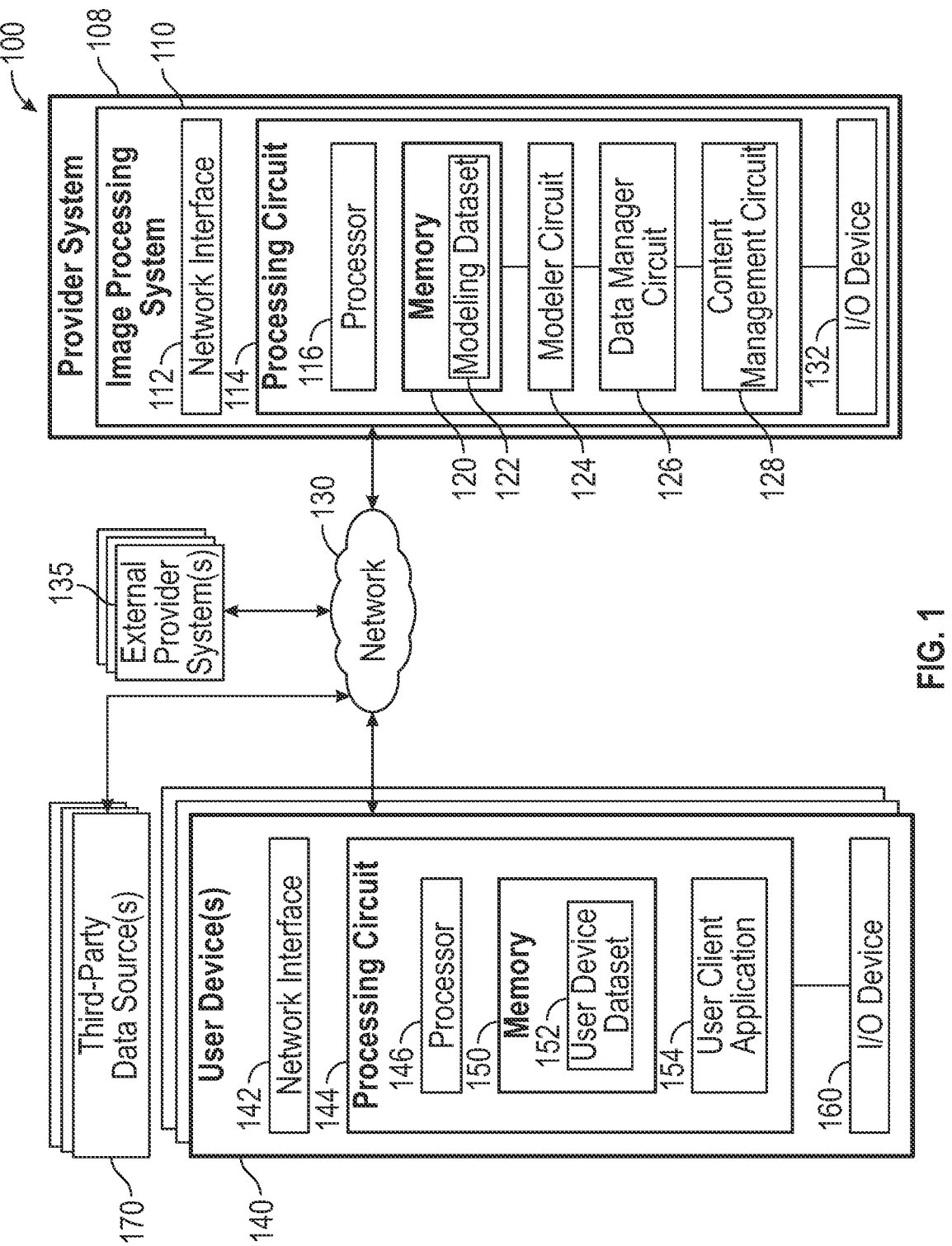
FIG. 1 is a block diagram of a computing environment including an image processing system, according to example embodiments.

Referring generally to the Figures, systems, computer-readable media, and methods described here in relate to augmenting a graphical user interface associated with at least one object that is depicted in an image acquired by an image acquisition device, such as a camera/or video-camera, of a user device such that action data associated with a prospective action associated with the at least one object may be overlaid over the image. The action data may be specific to a user of the user device based on user data relating to the user. These prospective actions may be generated based on image data associated with the image obtained by the image acquisition device of user device as well as the user data relating to the user associated with the user device. Through this process, the systems, computer-readable media, and methods disclosed herein may provide the user with simultaneous viewing of the action data overlaid over image data associated with the image. For example, the systems, computer-readable media, and meth-ods may utilize a client application executed by the user device with augmented reality capabilities to provide the graphical user interface with the action data overlaid over the image data. The user of the user device may be a customer of a provider institution associated with the client application, such that the client application stores the user device related to the user. An imaging processing system of the provider institution may generate the action data based on the image data and the user data and augment the graphical user interface using the augmented reality capa-bilities such that the graphical user interface includes the action data overlaid over the image data.

Additionally, in some instances, the systems, computer-readable media, and methods described herein include executing or enabling execution of the prospective action by at least one of providing instructions to the user regarding how to execute the prospective action, authorizing transac-tion requests associated with the prospective actions, and/or finding a sponsorship opportunity for the user corresponding to the prospective action such that the user may be able to execute the prospective action. In some instances, the sys-tems, computer-readable media, and methods compare pay-ment instruments (e.g., transaction instruments, methods of payment, etc.) and determine a preferred payment instru-ment for the user that will provide a benefit to the user in completing the prospective action. For example, in some instances, the systems, computer-readable media, and meth-ods described herein use one or more trained machine learning models to identify differences between using a first payment instrument or a second payment instrument to complete the prospective action for the at least one object in order to determine which of the payment methods/instruments provide a greater benefit (e.g., a higher value, etc.) to the user. In some instances, the systems, computer-readable media, and methods described herein then acquire and authorize a transaction request for the prospective action, such that the user may complete the prospective action using the preferred payment instrument(s).

In some instances, the systems, computer-readable media, and methods acquire the image obtained by the camera of the user device from the user device and identify the object depicted in the image using one or more image processing techniques or processes. In some instances, the systems, computer-readable media, and methods communicate with a merchant computing system of a merchant associated with the object depicted in the image to receive additional content associated with the object and provide the additional content associated with the object to the user via a display device of the user device.

Accordingly, the systems, computer-readable media, and methods described herein provide a variety of improvements to image processing systems. For example, traditional image processing systems may not provide a user with personalized action data corresponding to a prospective action associated with an object depicted in an image obtained by an image acquisition device of a user device. Additionally, traditional image processing systems may not provide the user with a graphical user interface that includes the personalized action data overlaid over image data associated with the image such that the user may simultaneously view the personalized action data and the image data. In other words, the combination of image data, third-party data (e.g., merchant data), and data to augment and/or enhance an interface displaying an image of a detected object by the user device is a non-routine and unconventional process associated with conventional image processing systems. In this regard and conventionally, the user may not be aware of prospective actions that are available to the user for objects that are positioned around the user and may not be able to take advantage the prospective actions for the objects. Additionally, the user may be overwhelmed with different payment instruments available to the user to complete the prospective actions (in this case, transactions), which may result in the user using one of the payment instruments to complete the prospective action that does not result in the highest benefit to the user. Further, even if the user is aware which of the payment instruments may result in the highest benefit to the user when used to complete the prospective actions (i.e., transactions in this example), the payment instruments may not have an available amount that is high enough to complete the prospective actions, preventing the user from completing the prospective transactions unless the user finds prospective sponsors offering sponsorship opportunities for the user that correspond to the prospective transaction.

The systems, computer-readable media, and methods described herein solve these issues by improving image processing systems. These objects are achieved by generating action data that is specific to the user associated with the user device based on image data associated with an image obtained by an image acquisition device of the user device and user data stored by a client application associated with a provider institution (or, stored elsewhere and retrieved for use). This approach allows for a user to receive additional information relating to objects around the user by pointing the image acquisition device of the user device towards the objects. Furthermore, the systems, computer-readable media, and methods assist the user with understanding prospective actions associated with the objects around the user by providing a graphical user interface to the user device that utilizes augmented reality to overlay the action data that is specific to the user over the image data including the image depicting the objects, such that the user can simultaneously view the action data and the image data. Thus, the systems and methods described herein provide a benefit over current systems.

Before turning to the figures, which illustrate certain example embodiments in detail, it should be understood that the present disclosure is not limited to the details or methodology set forth in the description or illustrated in the figures. It should also be understood that the terminology used herein is for the purpose of description only and should not be regarded as limiting.

Referring to FIG. 1, a block diagram of a computing environment 100 including a provider system 108 (e.g., a provider computing system, etc.), one or more user devices (e.g., user device 140), one or more third-party data sources (e.g., third-party data sources 170), and one or more external provider systems (i.e., the external provider system 135 are provider systems that are operated by different provider institutions than the provider institution of the provider system 108) is shown, according to an example embodiment. In some embodiments, the provider system 108, user device 140, third-party data sources 170, and the external provider system 135 are communicatively coupled. The various components of the computing environment are in communication with each other and are connected by a network 130. In various instances, the network 130 may be wired network (e.g., via Ethernet), a wireless network (e.g., via Wi-Fi, Bluetooth), a satellite network (e.g., via GPS), a pre-configured network, an ad-hoc network, a LAN, a WAN, etc. In other instances, the image processing system 110 may be separate from the provider system 108 and may be coupled to the provider system 108 by the network 130.

Although the various systems and devices are shown in FIG. 1 as being singular, it will be understood that, in some instances, the computing environment 100 includes one or multiple of any of the various illustrated systems and/or devices, as desired for a given application. Similarly, while the following descriptions of the various systems and devices are largely provided in terms of single systems or devices, it will be appreciated that these descriptions are similarly applicable to any additional corresponding systems and/or devices (e.g., additional of the external provider systems 135, additional of the user devices 140, and so on).

The provider system 108 is associated with a provider institution, such as a bank, a credit union, an appraiser, a health care institution, a governmental institution, or other institutions (e.g., credit card companies, financial institutions (FI), insurance institutions, etc.). In some instances, the provider system 108 includes an image processing system 110. In the example shown, the provider institution is a financial institution, such as a bank. In some embodiments, the provider system may, for example, comprise one or more servers, each with one or more processing circuits including one or more processors configured to execute instructions stored in one or more memory devices, send and receive data stored in the one or more memory devices, and perform other operations to implement the operations described herein associated with certain logic and/or processes depicted in the figures.

The provider system 108 is shown to include an image processing system 110. The image processing system 110 is configured or structured to determine prospective actions (e.g., prospective transactions, etc.) corresponding to objects depicted in images obtained by image acquisition devices of the user devices 140 and augment image capture graphical user interfaces of the user device 140 to provide information relating the prospective actions overlaid on image data associated with the images to the users of the user devices 140. The image processing system 110 includes a network interface 112 that couples the image processing system 110 to the network 130. The network interface 112 facilitates secure communications between the image processing system 110 and various other components of the computing environment 100. The network interface 112 also facilitates communication with other entities (e.g., external provider systems 135, etc.), such as other banks, healthcare systems, and so on. Further, in some arrangements, the network interface 112 includes cryptography capabilities to establish a secure or relatively secure communication session in which data communicated over the session is encrypted.

The at least one processing circuit 114 includes at least one processor 116, at least one memory 120, a modeler circuit 124, a data control circuit 126, and a content control circuit 128. In other embodiments, the at least one processing circuit 114 may contain more or less components than are shown in FIG. 1 (e.g., at least one processor, at least one memory, etc.). The at least one processor 116 may be implemented as one or more application specific integrated circuits (ASICs), field programmable gate arrays (FPGAs), a group of processing components, or other suitable electronic processing components. The at least one memory 120 may be a device for storing data and/or computer code. The at least one memory 120 may store data associated with a variety of application programs ran by the image processing system 110. One such application may be to provide data or information to the modeler circuit 124, data control circuit 126, and/or content control circuit 128.

The at least one memory 120 can store a variety of data related to the modeler circuit 124 in a modeling dataset 122, which may be used by the modeler circuit 124 as discussed herein. The at least one memory 120 may be a random-access memory (RAM) or other dynamic storage device. The at least one memory 120 can also be used for storing position information, temporary variables, or other intermediate information during execution of instructions by the at least one processor 116. The at least one memory 120 may further include a read only memory (ROM) or other static storage device for storing static information and instructions for the at least one processor 210. Additionally, the at least one memory 120 may include a solid-state device, magnetic disk, or optical disk for persistently storing information and instructions.

The modeler circuit 124 is structured or configured to perform a variety of the functionalities described herein. As will be described in detail below, with regard to FIG. 2, the modeler circuit 124 is configured to generate action data specific to the user of the user device 140 for satisfying at least one action requirement (e.g., at least one action requirement, etc.) to complete the prospective action that is associated with at least one object depicted in an image obtained by an image acquisition device (e.g., a camera, a video camera, etc.) of the user device 140. As will similarly be described below, in some instances, the modeler circuit 124 is further configured to generate a first amount for the prospective action that corresponds with a first transaction instrument (e.g., a first action instrument, a first payment instrument, etc.) and a second amount for the prospective action that corresponds with a second transaction instrument (e.g., a second action instrument, a second payment instrument, etc.). In some instances, the modeler circuit 124 is additionally configured to identify a variation between exchanging the second amount with the second transaction instrument during the prospective action and exchanging the first amount with the first transaction instrument during the prospective action. In some instances, the modeler circuit 124 is further configured to generate a value offset of the variation that is a representation of exchanging the first amount with the first transaction instrument during the prospective action resulting in a higher value to the user than exchanging the second amount with the second transaction instrument during the prospective action and provide the value offset to the user such that the user may compare benefits between using the first transaction instrument or the second transaction instrument to complete the prospective action.

In some instances, the modeler circuit 124 is configured to determine that an available amount for the prospective action corresponding to at least one transaction instrument (e.g., at least one action instrument, at least one purchase instrument, etc.) is below an action amount associated with the at least one action requirement. In some instances, the modeler circuit 124 is further configured to perform a search for a sponsorship opportunity for the user corresponding to the prospective action and generate result data for the search including at least one prospective sponsor offering the sponsorship opportunity to the user to complete the prospective action. The at least one prospective sponsor may be the provider institution of the provider system 108 or the addition provider institutions of the external provider system 135 and the sponsorship opportunity may be a loan or an advance offered by the provider institution of the provider system 108 or the additional provider institutions of the external provider system 135 that may allow for the user to make up a difference between the available amount corresponding to the at least one transaction instrument and the action amount associated with the at least one action requirement, such that the user can complete the prospective action by accepting the sponsorship opportunity even if the user cannot afford to complete the prospective action using the at least one transaction instrument.

In some instances, the modeler circuit 124 is configured to provide action instructions to the user which include steps that the user can take to complete the prospective action from the action data. In some instances, the modeler circuit 124 is configured to identify at least one object depicted in the image obtained by the image acquisition device of the user device 140 and generate image data by associated the at least one object with object data stored by the image processing system 110. For example, the modeler circuit 124 may utilize image recognition techniques to identify the object depicted in the image.

The data control circuit 126 is configured or structured to fuse data (e.g., perform data integration, etc.), including operations to generate various data structures stored in the at least one memory 120 and used by the various circuits described herein. The data control circuit 126 can also be configured to receive data from multiple sources (e.g., the third-party data sources 170, the external provider systems 135, the user devices 140, etc.) and aggregate the data into various data structures stored in the at least one memory 120. For example, the data control circuit 126 may be configured to receive a first data set from the third-party data sources 170 and a second data set from the external provider system 135 and combine the first data set and the second data set using data fusion techniques. The data fusion techniques may include concatenating tables included in the data sets, merging the data sets based on common identifiers, aggregating the data sets by summing similar data points, etc. The fused data may be utilized by the image processing system 110 to perform the image processing analysis. For example, the data control circuit 126 may fuse image data associated with an image obtained by an image acquisition device of the user device 140 and merchant data acquired from an API of a merchant computing system associated with an object depicted in the image so that the image processing system 110 can use the fused image data and merchant data to generate an image capture graphical user interface for the user device 140 without having to process repeated data points included in both the image data and the merchant data.

The content control circuit 128 is or structured or configured to generate content for displaying to users. The content can be selected from various sources (e.g., a request for a photograph of associated with the at least one object from the data control circuit 126). The content control circuit 128 can also be structured to provide content (e.g., via a graphical user interface (GUI)) to the user device 140 over the network 130) for display. The content can also include actionable items (e.g., buttons, sliders, icons, etc.) that the user may select or otherwise manipulate. The content can be selected from various sources (e.g., from the data control circuit 126, from the at least one memory 120, etc.).

The content generated by the content control circuit 128 can include customized or augmented dashboards, such as those described in detail below, with reference to FIGS. 4-18 The content control circuit 128 can generate customized user-interactive dashboards for one or more entities, such as the user device 140, based on data received from the user device 140, third-party data sources 170, and/or any other computing device described therein. The generated dashboards can include various data (e.g., data stored in the content control circuit 128 and/or modeling dataset 122) associated with one or more objects such as valuations, photographs or videos, descriptions, and/or others. In certain embodiments, the image processing system 110 includes an application programming interface (API) and/or a software development kit (SDK) that facilitate the integration of other applications with the image processing system 110. For example, the image processing system 110 is configured to utilize the functionality of the user device 140 interacting through an API of the external provider systems 135.

The content control circuit 128 is structured or configured to generate or augment an image capture graphical user interface (e.g., a transaction interface, etc.) corresponding to the action data generated by the modeler circuit 124. The image capture graphical user interface may include elements (e.g., text, images, buttons, videos, etc.) associated with data acquired or generated by the modeler circuit 124 (e.g., the image data, the action data, the merchant data, etc.). In various instances, the content control circuit 128 is structured or configured to augment the image capture graphical user interface generated or launched by a different device (e.g., the user device 140, etc.). For example, after the modeler circuit 124 has generated the action data relating to how the user can meet the at least one action requirement to complete the prospective action, the content control circuit 128 may augment the image capture graphical user interface by including the action data. In some instances, the content control circuit 128 may augment the image capture graphical user interface into a first augmented state. In the first augmented state, the image capture graphical user interface may include the action data specific to the user overlaid over the image data including the at least one object to provide simultaneous viewing of the at least one object with the action data specific to the user. The image capture graphical user interface may include a first element corresponding to the image data (e.g., the image depicting the at least one object, etc.) and a second element corresponding with the action data, such that the user may be provided with the second element corresponding to the action data overlaid over the first element corresponding to the image data such that the user may be provided with both the first element and the second element concurrently (e.g., simultaneously, etc.).

In some instances, prior to the modeler circuit 124 determining the prospective action associated with the at least one object that includes the at least one action requirement related to completing the prospective action, the content control circuit 128 may augment the image capture graphical user interface to overlay an intermediate element indicating data processing over the image data including the at least one object. For example, the intermediate element may be three dots, a loading bar, a spinning wheel, etc., such that the user may be made aware that the modeler circuit 124 is determining the prospective action that may be completed by the user and is associated with the at least one object. The intermediate element indicating data processing may be overlaid on over the image data including the at least one object. In some instances, when the content control circuit 128 augments the image capture graphical user interface after the modeler circuit 124 has generated the action data specific to the user, the action data specific to the user replaces the intermediate element when the image capture graphical user interface is augmented to include the action data, such that the user may be made aware that the modeler circuit 124 has determined the prospective action that may be completed by the user and is associated with the at least one object.

In some instances, after the modeler circuit 124 has generated the value offset corresponding to the first transaction instrument and the second transaction instrument, the content control circuit 128 is configured to augment the image capture graphical user interface by including the value offset. The augmentation to the image capture graphical user interface may overlay the value offset over the image data including the at least one object to provide simultaneous viewing of the at least one object with the value offset For example, the value offset may include a first image relating to the first transaction instrument and a second image relating to the second transaction instrument and may overlay the first image on top of the second image to promote the first transaction instrument over the second transaction instrument. As another example, the value offset may be a graph or chart of the value offset representative of exchanging the first amount with the first transaction instrument during the prospective action resulting in a higher value to the user than exchanging the second amount with the second transaction instrument during the prospective action such that the user may readily visualize the value offset between using the different transaction instruments. In some instances, the value offset may promote the first transaction instrument over additional transaction instruments (e.g., a third transaction instrument, a fourth transaction instrument, etc.) in addition to the second transaction instrument.

In some instances, the image capture graphical user interface can include one or more actionable items (e.g., buttons, sliders, icons, etc.) associated with the prospective action, the first transaction instrument, and/or the second transaction instrument that allow for the image processing system 110 to proceed with additional actions in response to receiving a selection of the actionable items from the user device 140. For example, in response to receiving the selection of the actionable items from the user device, the image processing system 110 may proceed with generating one or more action instructions associated with the prospective action or acquiring an action request including action information associated with the prospective action from a merchant computing system.

In some instances, after the modeler circuit 124 has generated the result data for the search for the sponsorship opportunity, the content control circuit 128 may augment the image capture graphical user interface by including the result data. The augmentation to the image capture graphical user interface may overlay the result data over the image data including the at least one object to provide simultaneous viewing of the at least one object with the result data specific to the user. For example, the result data include a logo of the at least one prospective sponsor or details corresponding to the sponsorship opportunity offered by the at least one prospective sponsor. The logo included in the result data may be overlaid over the image associated with the image data depicting the at least one object such that the user may be provided with both the logo and the image concurrently.

In some instances, the content control circuit 128 can augment the image capture graphical user interface to include one or more action instructions (e.g., generated by the modeler circuit 124) associated with the prospective action overlaid over the image data. The image capture graphical user interface may include a plurality of instructions or steps in a process to complete the prospective action.

The input/output device 132 is structured to receive communications from and provide communications to users associated with the image processing system 110. The input/output device 132 can be structured to exchange data, communications, instructions, etc. with an input/output component of the image processing system 110 (e.g., a mouse, a monitor, a keyboard, a touch screen, a trackball, a biometric sensor, etc.). As such, the input/output device 132 may provide an interface for the user to interact with various applications stored on the image processing system 110. In some instances, the input/output device 132 of the image processing system 110 is the user device 140.

According to various arrangements, the processes that effectuate illustrative arrangements that are described herein can be achieved by the image processing system 110 in response to the at least one processor 116 executing an arrangement of instructions contained in the at least one memory 120. Execution of the arrangement of instructions contained in the at least one memory 120 causes the image processing system 110 to perform the illustrative processes described herein. One or more processors in a multi-processing arrangement may also be employed to execute the instructions contained in the at least one memory 120. In alternative arrangements, hard-wired circuitry may be used in place of or in combination with software instructions to implement illustrative arrangements. Thus, arrangements are not limited to any specific combination of hardware circuitry and software.

Although an example processing system has been described in FIG. 1 with regards to the image processing system 110, arrangements of the subject matter and the functional operations described in this specification can be carried out using other types of digital electronic circuitry, or in computer software (e.g., application, blockchain, distributed ledger technology) embodied on a tangible medium, firmware, or hardware, including the structures disclosed in this specification and their structural equivalents, or in combinations of one or more of them. Arrangements of the subject matter described in this specification can be implemented as one or more computer programs, e.g., one or more subsystems of computer program instructions, encoded on one or more computer storage medium for execution by, or to control the operation of, data processing apparatus. Alternatively, or in addition, the program instructions can be encoded on an artificially generated propagated signal, e.g., a machine generated electrical, optical, or electromagnetic signal, that is generated to encode information for transmission to a suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). Accordingly, the computer storage medium is both tangible and non-transitory (e.g., a non-transitory computer-readable storage medium, etc.).

Although the image processing system 110 is shown in the arrangements of FIG. 1 as a singular, stand-alone device, one of ordinary skill in the art will appreciate that, in some arrangements, the image processing system 110 may include virtualized systems and/or system resources. For example, in some arrangements, the image processing system 110 may be a virtual switch, virtual router, virtual host, or virtual server. In various arrangements, the image processing system 110 may share physical storage, hardware, and other resources with other virtual machines. In some arrangements, virtual resources of the network 130 may include cloud computing resources such that a virtual resource may rely on distributed processing across more than one physical processor, distributed memory, etc. In some instances, the image processing system 110 may share physical storage, hardware, and other resources with the user device 140.

The user device 140 is owned, operated, controlled, and/or otherwise associated with a user. The user device 140 may be or may include, for example, a desktop or laptop computer (e.g., a tablet computer), a smartphone, a wearable device (e.g., a smartwatch), a personal digital assistant, and/or any other suitable computing device. The user devices 140 may each include at least one of a network interface 142, at least one processing circuit 144, and at least one input/output devices 160 (among potentially other components and/or systems).

In some instances, the user associated with the user device 140 is a customer of the provider institution of the provider system 108 and may have one or more accounts maintained with the provider institution of the provider system 108. In various instances, the user associated with the user device 140 is a customer of the additional provider institutions of the external provider systems 135 and may have one or more accounts maintained with the additional provider institutions of the external provider systems 135. The network interface 142 couples the user device 140 to the network 130. The network interface 142 may be configured to enable communications with the network 130 and/or other computing systems. In various illustrative arrangements, any type of networking configuration may be achieved using network interface 142, such as wired (e.g., via Ethernet), wireless (e.g., via Wi-Fi, Bluetooth), satellite (e.g., via GPS) preconfigured, ad-hoc, LAN, WAN.

The at least one processing circuit 144 includes at least one processor 146, at least one memory 150, and a user client application 154. In other embodiments, the at least one processing circuit 144 may contain more or less components than are shown in FIG. 1. The at least one processor 146 may be implemented as one or more application specific integrated circuits (ASICs), field programmable gate arrays (FPGAs), a group of processing components, or other suitable electronic processing components. The at least one memory 150 may be a device for storing data and/or computer code. The at least one memory 150 may store data associated with a variety of application programs ran by the image processing system. One such application may be to provide data or information to the user client application 154. The variety of application programs and associated data may be stored as user device dataset 152.

The at least one input/output device 160 can include any type of input, output, or input/output device, such as a biometric sensor, touch screen, cursor control, such as a mouse, a trackball, or cursor direction keys, for communicating direction information and command selections to the at least one processor 146 and for controlling cursor movement on the display of the user device 140.

Additionally, the at least one processing circuit 144 of each of the user devices 140 may each store, in the at least one memory 150, and execute ("run") the user client application 154. The user client application 154, also referred to herein as a provider institution client application, may be provided by and at least partially supported by the provider system 108 and be configured to enable the various functionality described herein. For example, in some instances, the user client application 154 may be a financial institution banking application, since in the example shown, the provider institution is a financial institution.

In some instances, the user client application 154 is additionally coupled to various components within the computing environment 100 (e.g., the image processing system 110, the external provider system 135) via one or more application programming interfaces (APIs) and/or software development kits (SDKs) to integrate one or more features or services provided by the various components to enable the various methods and operations described herein. For example, in some instances, the user client application 154 provided to the user device 140 by the image processing system 110 implements various functionality of the external provider system 135 via one or more APIs and/or SDKs to allow for various functionality and/or information provided and/or stored by the external provider system 135 to be utilized or otherwise implemented within the context of the user client application 154.

Additionally, the user client application 154 is configured to generate and provide or output information to a display of the user device 140 regarding information received from the image processing system 110. In some instances, the user client application 154 is configured to generate and provide the image capture graphical user interface to the display of the user device 140. For example, the user client application 154 may be configured to communicate with a display device of the user device 140 to show the image capture graphical user interface including content associated with an object, such as a photograph or video, a valuation, or a description. Further, a user response to a display of the user device 140 regarding information from the image processing system 110 can send a message, task, or instruction to the image processing system 110 via the network 130 that allows for the modeling dataset 122, modeler circuit 124, data control circuit 126, and/or content control circuit 128 to be perform an update. In some instances, the user client application 154 may receive data from the image processing system 110 that results in augmentations (e.g., enhancements, etc.) to the image capture graphical user interface. For example, the user client application 154 may receive data from the image processing system 110 that results in an augmentation to the image capture graphical user interface by including the action data generated by the image processing system 110.

In some instances, the user client application 154 may be configured to receive an indication of a log-in into the user client application 154 and launch the image capture graphical user interface in response to receiving the indication of the successful log-in into the user client application 154. For example, the user client application 154 may include a log-in interface configured to receive an input from the user of the user device 140 corresponding to authentication of the user to access the user client application 154. Based on the authentication information (e.g., biometric information, credential(s), etc.) matching stored data in the user client application 154 and/or the image processing system 110, the user client application 154 may launch the image capture graphical user interface such that the user of the user device 140 is provided with the image capture graphical user interface.

In various instances, the at least one processing circuit 144 of each of the user devices 140 may each store, in the at least one memory 150, and execute additional user client applications such as an Internet browser presenting websites and/or applications provided or authorized by entities implementing or administering any of the computing systems in computing environment 100 to enable the customer to perform or otherwise interact with various methods and operations described herein. In some instances, the additional user client applications comprise a provider client application provided by and at least partly supported by the external provider system 135 and configured to enable various functionality.

The third-party data sources 170 are data sources associated with third parties relative to the provider institution of the provider system 108 that can provide data to the image processing system 110 and/or the user device 140. In some arrangements, the third-party data sources 170 can be structured to collect data from other devices on network 130 (e.g., user devices 140 and/or other third-party devices) and relay the collected data to the image processing system 110 and/or the user device 140. In some embodiments, the image processing system 110 may request data associated with specific data stored in the data source (e.g., third-party data sources 170). For example, in some arrangements, the third-party data sources 170 can support a search or discovery engine for Internet-connected devices. The search or discovery engine may provide data from other provider institutions (e.g., the additional provider institutions of the external provider systems 135, etc.) that, when used to update the image data associated with the image obtained by the image acquisition device of the user device 140, may add additional information or content to the image data that is associated with the at least one object depicted in the image. For example, the search or discovery engine may provide offer data from a provider institution associated with the at least one object that, when added to the image data, allows for the modeler circuit 124 to generate the action data associated with the at least one object.

With reference again to FIG. 1, the external provider system(s) 135 is controlled by, managed by, owned by, and/or otherwise associated with another provider institution, such as a bank, a credit union, an appraiser, a health care institution, a governmental institution, or other institutions (e.g., credit card companies, financial institutions (FI), insurance institutions, etc.) that is different from the provider institution that controls, manages, owns, or is otherwise associated with the provider system 108. In some embodiments, the other provider system may, for example, comprise one or more servers, each with one or more processing circuits including one or more processors configured to execute instructions stored in one or more memory devices, send and receive data stored in the one or more memory devices, and perform other operations to implement at least some of the operations described herein associated with certain logic and/or processes depicted in the figures. In some instances, the external provider systems 135 includes and/or has various other devices communicably coupled thereto, such as, for example, desktop or laptop computers (e.g., tablet computers), smartphones, wearable devices (e.g., smartwatches), and/or other suitable devices.

With an example structure of the computing environment 100 being described above, example processes performable by the computing environment 100 (or components/systems thereof) will be described below. It should be appreciated that the following processes are provided as examples and are in no way meant to be limiting. Additionally, various method steps discussed herein may be performed in a different order or, in some instances, completely omitted. These variations have been contemplated and are within the scope of the present disclosure.

Referring now to FIG. 2, a flowchart for a method 300 of augmenting an image capture graphical user interface to overlay action data specific to a user over image data associated with an image obtained by an image acquisition device of a user device is shown, according to some embodiments. The image processing system 110 can be configured to perform method 300 or parts thereof. In other embodiments, another computing system, such as the user device 140, may be configured or structured to perform the method 300. In still other embodiments, the image processing system 110 and the user device 140 may be configured or structured to cooperatively perform the method 300 (e.g., a first portion of the method 300 can be performed by the image processing system 110 and a second portion of the method 300 can be performed by the user device 140, etc.). Thus, in some embodiments, the method 300 may be performed by the image processing system 110 and/or the user device 140, described above pertaining to FIG. 1. The GUI of the method 300 may be provided by the content control circuit 128 of the image processing system 110 and/or the user client application 154 of the user device 140 and may be accessible by the user of the user device 140.

In some embodiments, the method 300 includes acquiring, by the user device 140 and/or through the user client application 154, data from the user device dataset 152. The data from the user device dataset 152 can include image data relating to an image acquired by an image acquisition device of the user device 140. The image data may include a data set corresponding to an image and may be stored by the image processing system 110, the third-party data sources 170, the external provider system 135, the user device 140, the user client application 154, etc. For example, the image acquisition device may be a camera of the user device 140 configured to obtain stationary images (e.g., photographs, etc.) and/or moving images (e.g., videos, etc.) and the user device 140 may generate and store the image data based on images obtained by the image acquisition device. In other instances, the image data may relate to an image that was captured in the past and stored by the user client application 154, additional user client applications (e.g., an internet access user client application, a social media user client application, an image storage user client application, etc.) the user device 140 or the image processing system 110.

In some instances, the method 300 begins with the at least one processing circuit 114 of the image processing system 110 receiving an indication of a successful log-in into the user client application 154 associated with a provider institution, at step 302. The user client application 154 may be executed by the user device 140 associated with the user. In some instances, the log-in causes a launching of an image capture graphical user interface from within the user client application 154 of the user device 140. The at least one processing circuit 114 of the image processing system 110 may receive the indication of the log-in into the user client application 154 from the user device 140 via the network 130. In some instances, the at least one processing circuit 114 may verify the indication of the log-in into the user client application 154 prior to providing the user of the user device 140 access into the user client application 154. For example, the at least one processing circuit 114 may receive at least one credential inputted by the user into the user client application 154. In some instances, the at least one credential may be a username and password, biometric data (e.g., a fingerprint, a facial scan, etc.), or any other type of security credential. The at least one processing circuit 114 may verify that the credentials match stored credential data stored by the provider system 108 and/or the third-party data sources 170, generate a login token for the user, and provide the login token to the user device 140 to be stored by the user device 140 and/or the user client application 154. The login token may allow for the user device 140 to access the user client application 154 and subsequent requests from the user client application 154 to the image processing system 110 may require the login token for the image processing system 110 to acknowledge the subsequent requests. In some instances, the login token may have an expiration time such that requests received by the image processing system 110 from the user device 140 after the expiration of the login token may not be acknowledged by the image processing system 110.

In some instances, the user may be able to access the image acquisition device of the user device 140 without the image processing system 110 receiving the indication of the log-in into the user client application 154 of the user device 140, but may not be able to access the image processing analysis capabilities of the image processing system 110 without the image processing system 110 receiving the indication of the log-in into the user client application 154. For example, the user of the user device 140 may still be able to take pictures with the image acquisition device of the user device 140 without logging into the user client application 154, but the user may not have access to the additional image processing capabilities of the image processing system 110 without logging into the user client application 154.

Once the at least one processing circuit 114 of the image processing system 110 has received the indication of a log-in into the user client application 154 associated with the provider institution, the at least one processing circuit 114 is configured or structured to acquire (e.g., receive, etc.) image data associated with an image and user data relating to the user, at step 304. The user may be the user associated with the user device 140. The image associated with the image data may be obtained (e.g., captured, acquired etc.) by the image acquisition device of the user device 140 (e.g., a camera of the user device 140, a video camera of the user device 140 etc.) via the image capture graphical user inter-face of the user client application 154 or may have been captured in the past and stored by the user device 140, the image processing system 110, the third-party data sources 170, the external provider system 135, the provider system 108, the user client application 154, etc. For example, the image may be a photograph taken by the camera of the user device 140, the image may be a live preview of a view of the camera of the user device 140 before a photograph is taken (e.g., a preview, a view finder view, a live view, etc.), or the image may have been previously taken by the camera of the user device 140 and have been stored by the user client application 154. The image data may be associated with at least one object (e.g., an item, a QR code, a property, a price tag, etc.) depicted in the image.

As used herein, "object" refers to a physical or digital item depicted in the image that may be associated with an action made or potentially made by the user of the user device 140. For example, the object depicted in the image could be a physical item that could be purchased by the user of the user device 140, a second user that the user of the user device 140 could transfer money to, a service that could be purchased by the user of the user device 140, etc. For example, if the camera of the user device 140 is directed at a house, the object may be the house. As another example, if the image acquisition device of the user device 140 is directed at a QR code, the image data associated with the image obtained by the camera may be associated with an offering that corresponds to the QR code.

In some instances, the image data associated with the image may include all of the information required to per-form the image processing analysis. In other embodiments, the modeler circuit 124 may need to receive additional image data associated with the image from a different source (e.g., the external provider system 135, the third-party data sources 170, etc.). For example, a user may request that an image processing analysis be performed through the user client application 154 of the user device 140 by aiming the camera of the user device 140 toward at least one object to obtain an image with the camera of the user device 140.

In some instances, the user device 140 may perform one or more image processing techniques on the image obtained by the camera of the user device 140 in order to identify at least one object depicted in the image. The user device 140 may be configured to process the image in order to extract key features and patterns and then identify the at least one object depicted in the image based on the key features and patterns. For example, the user device 140 may utilize vector-based image analysis to detect contours or edges of the object depicted in the image and may identify the at least one object depicted in the image based on the contours or the edges. Alternatively or additionally, the user device 140 may perform pixel-based image analysis to examine and process individual pixels in the image to identify the at least one object depicted in the image. As another example, the at least one processor 146 of the user device 140 (or the image processing system 110) may be configured to utilize pre-trained neural networks to identify the at least one object depicted in the image (e.g., neural networks that were trained by the manufacturer of the user device 140, neural networks that were trained by a software provider associated with the user device 140, etc.).

In other instances, the at least one processing circuit 114 of the image processing system 110 may receive additional image data from a different source (e.g., the external pro-vider systems 135, the third-party data sources 170, etc.) to identify the at least one object in the image data. For example, the image data received from the user device 140 may not include any identification of the object depicted in the image (e.g., when the user device 140 does not perform the image processing, etc.). The image data may be provided to an external image processing system (e.g., an external image processing system operated by the external provider systems 135, etc.) such that the image may be processed by the external image processing system in order to identify the at least one object depicted in the image and update the image data to be associated with the at least one object depicted in the image. The external image processing system may provide the image data associated with the at least one object back to the at least one processing circuit 114 of the image processing system 110 to perform the image process-ing analysis. As another example, the at least one processing circuit 114 of the image processing system 110 may provide the image data via an application programing interface (API) of a merchant computing system of a merchant (which may be part of the external provider systems 135) corresponding to the at least on object associated with the image data. The API of the merchant computing system may store merchant data that includes additional information associated with the at least one object. The at least one processing circuit 114 of the image processing system 110 circuit may acquire the merchant data from the API of the merchant computing system associated with the at least one object and may incorporate the merchant data into the image data such that the object data may be utilized by the image processing system 110 during the image processing analysis. In some instances, the object data may include descriptions of the at least one object, photographs of the at least one object, videos of the at least one object, valuations of the at least one object, or other elements that may relate to the at least one object. In various instances, the at least one processing circuit 114 of the image processing system 110 may request and receive content associated with the at least one object from the application programming interface (API) of the merchant computing system of the merchant. For example, the content may include at least one of a photograph or video of the at least one object or a description of the at least one object.

In some instances, the at least one processing circuit 114 of the image processing system 110 is configured to perform image processing on the image obtained by the image acquisition device of the user device 140 to generate the image data for the image processing analysis. In some instances, the at least one processing circuit 114 is config-ured to acquire the image obtained by the image acquisition device of the user device 140 from the user device 140. The at least one processing circuit 114 is also configured to identify the at least one object depicted in the image using an object detection technique and generate the image data associated with the at least one object based on the identi-fication of the at least one object depicted in the image. For example, the object detection technique used by the at least one processing circuit 114 to identify the at least one object depicted in the image may be similar to the image processing described above in relation to the user device 140. As another example, the at least one processing circuit 114 may model the image using machine processing techniques dis-cussed herein to identify the at least one object depicted in the image and generate the image data associated with the at least one object.

In some instances, the user data of the user received in step 304 relates to a user associated with the user device 140 that acquired the image associated with the image data received in step 304. The user data of the user may be stored in the user client application 154 and may be provided to the image processing system 110 by the user client application 154. The user data may include information related to the user's accounts maintained with the provider of the provider system 108. Alternatively or additionally, after the successful log-in into the user client application 154 and receiving the image data, the provider system 108 may retrieve the account information of the user associated with the user client application 154 (e.g., by correlating a received unique application ID to an account listing) to identify the user account and retrieve user data. User data may refer to/include information relating to a user that may be used to determine characteristics about the user or perform analysis on prospective transactions of the user such as financial data, credit card data, credit score data, transaction history data, financial health data, relationship data, or other information related to the prospective transactions of the user. For example, the user data could include indications that the user has access to various transaction instruments (e.g., bank accounts, credit cards, debit cards, checking accounts, savings accounts, etc.) that may be used to complete the prospective transactions. As another example, the user data could include a credit score indication of the user that may be used to determine if the user qualifies for a loan in order to complete the prospective transactions.

Once the at least one processing circuit 114 of the image processing system 110 has acquired the image data associated with the image and the user data relating to the user, the at least one processing circuit 114 is configured to determine a prospective action associated with an object depicted in the image, at step 306. The prospective action may include at least one action requirement related to completing the prospective action. In some instances, the at least one processing circuit 114 is configured to determine a prospective action associated with at least one object depicted in the image. The prospective action may be determined based on the image data. For example, the image data may be associated with a first object and a second object, the prospective action may be an action related to acquiring the first object and the second action, and the at least one action requirement may be a requirement for a certain amount that will be exchanged for the first object and the second object. As another example, the image data may be associated with a house, the prospective action may be to purchase the house, and the action requirements may include a down payment amount that must be paid to purchase the house and a credit score threshold that must be achieved in order to take out a loan to purchase the house.

Once the at least one processing circuit 114 of the image processing system 110 has determined the prospective action associated with the object depicted in the image, the at least one processing circuit 114 is configured to generate action data specific to the user for satisfying the action requirement to complete the prospective action, at step 308. In some instances, the action data may be generated based on comparing the at least one action requirements to the user data, such that the action data is specific to the user because it is based on the user data. For example, the image may depict a washing machine, the image data may be associated with the washing machine, the prospective action may include an amount to be exchanged for the washing machine to complete the prospective action of purchasing the washing machine, and the user data may include an indication that the user has access to a credit card. The at least one processing circuit 114 can compare the requirement for the amount to be exchanged for the washing machine with the user data including the indication that the user has access to the credit card to generate the action data indicating that the user can satisfy the requirement for the amount to be exchanged for the washing machine with the credit card to complete the prospective action.

As an additional example, the at least one processing circuit 114 may generate the action data based on upcoming actions included in the user data. For example, for a prospective action related to purchasing a car, the at least one processing circuit 114 may generate the action data based on an upcoming action included in the user data of the user purchasing a house. Based on the user purchasing the house, the action data may correspond to a projection of the information included in the user data to a time after the user has purchased the house, such that the action data takes into account the purchase of the house when generating the action data for the prospective action relating to purchasing the car. As a result, the at least one processing circuit 114 may account for future planned actions by the user when generating the action data.

In some instances, the at least one processing circuit 114 is configured to generate a first amount and a second amount associated with the prospective action. In some instance, the user data relating to the user corresponds to a first transaction instrument and a second transaction instrument and the at least one processing circuit 114 is configured to generate the first amount and the second amount based on modeling the first transaction instrument and the second transaction instrument with the prospective action. The first amount may correspond to the first transaction instrument and the second amount may correspond to the second transaction instrument. For example, the user data relating to the user may include an indication that the user is associated with a credit card and a banking account. The at least one processing circuit 114 may generate a first amount associated with the prospective action corresponding to the credit card and a second amount associated with the prospective action corresponding to the banking account based on modeling the credit card and the banking account with the prospective action. In some instances, the modeling of the first transaction instrument and the second transaction instrument with the prospective action may include simulating using the first transaction instrument and the second transaction instrument to complete the prospective action. In some instances, the first amount and the second amount are the same amount. For example, in a prospective action relating to purchasing a bookshelf, a first amount associated with a credit card and a second amount associated with a debit card may be the same amount. In other instances, the first amount and the second amount are different amounts. For example, in a prospective action relating to purchasing a sandwich, a first amount corresponding to a credit card may be greater than a second amount corresponding to a debit card (E.g., based on a vendor of the sandwich offering a cash discount, etc.).

In some instances, the at least one processing circuit 114 is further configured to identify at least one variation between exchanging the second amount with the second transaction instrument during the prospective action for the at least one object and exchanging the first amount with the first transaction instrument during the prospective action for the at least one object. The variation represents a difference between using the first transaction instrument to complete the prospective action for the at least one object and using the second transaction instrument to complete the prospective action for the at least one object. For example, the variation may be that the first amount is higher than the second amount, that the second amount results in a higher bonus amount being returned than the first amount, that the second amount results in a tax rebate that is higher than the first amount, and/or additional differences between exchanging the first amount with the first transaction instrument for the at least one object and exchanging the second amount with the second transaction instrument for the at least one object. These variations may allow for a user to reduce an amount used to make the purchase associated with the offer. For example, the variation between exchanging a first amount with a credit card and a second amount with a bank account during the prospective action may be that the credit card offers cash back on the prospective action to the user if the user completes the prospective action using the credit card. As another example, the variation between exchanging a first amount with a credit card and a second amount with a bank account during the prospective action may be that the credit card offers points on the prospective action credited to a points account of the user if the user completes the prospective action using the credit card.

Subsequently, the at least one processing circuit 114 may generate a value offset corresponding to the variation. For example, the at least one processing circuit 114 may model the at least one variation between exchanging the second amount with the second transaction instrument to complete the prospective action and exchanging the first amount with the first transaction instrument to complete the prospective action to generate the value offset corresponding to the variation. The value offset is a representation of a variation amount of the variation between exchanging the first amount with the first transaction instrument to complete the prospective action and exchanging the second amount with the second transaction instrument to complete the prospective action. For example, the value offset may be a difference between the second amount and the first amount, a difference between the bonus amount of the first amount and the second amount, a difference between the tax rebate of the first amount and the second amount, and/or additional variation amounts of the difference between exchanging the first amount with the first transaction instrument to complete the prospective action and exchanging the second amount with the second transaction instrument to complete the prospective action. As another example, in some instances, the value offset may be an amount that the user would save (e.g., not spend, etc.) when completing the prospective action for a first amount with a first transaction instrument instead of completing the prospective action for a second amount with a second transaction instrument (e.g., when the first amount and the second amount are different amounts, etc.).

In some instances, the value offset may indicate that exchanging the first amount with the first transaction instrument to complete the prospective action has a higher value than exchanging the second amount with the second transaction instrument to complete the prospective action. For example, the value offset may indicate that a first value of a rebate and a discount associated with exchanging the first amount with the first transaction instrument to complete the prospective action is higher than a second value of a tax rebate associated with exchanging the second amount with the second transaction instrument to complete the prospective action. In other instances, the value offset may indicate that exchanging the second amount with the second transaction instrument to complete the prospective action has a higher value than exchanging the first amount with the first transaction instrument to complete the prospective transaction.

In some instances, the at least one processing circuit 114 can acquire a transaction request (e.g., an action request, etc.) corresponding to the first transaction instrument or the second transaction instrument. In some embodiments, the request may be acquired from a merchant computing system associated with a vendor of the at least one object. For example, a user of the user device 140 can initiate the prospective action to purchase the at least one object using the first transaction instrument or the second transaction instrument through the merchant computing system, the image processing system 110, or the user client application 154. The merchant computing system can then send the transaction request to the at least one processing circuit 114. For example, the user of the user device 140 may initiate a purchase of a vehicle though a website of a vehicle dealership using a check. The computing system of the vehicle dealership can generate a purchase request and can then communicate the purchase request to the at least one processing circuit 114. In some embodiments, the transaction request includes transaction information of the prospective action. For example, the transaction request can include identifying information regarding the prospective action such that the at least one processing circuit 114 may determine properties of the prospective action from the transaction request.

In some instances, the at least one processing circuit 114 can authorize the transaction request received by the at least one processing circuit 114 for the first amount based on the transaction request corresponding to the first transaction instrument or the second amount based on the transaction request corresponding to the second transaction instrument. For example, the at least one processing circuit 114 can determine that the transaction request received from the merchant computing system corresponds to either the first amount or the second amount and corresponds to the first transaction instrument or the second transaction instrument and then approve the transaction request such that a vendor of the merchant computing system receives the first amount or the second amount from the first transaction instrument or the second transaction instrument. For example, the at least one processing circuit 114 can receive a purchase request corresponding to a boat from a vendor system that corresponds to a price and a checking account. The one or more processors can then authorize the purchase request such that an amount equal to the price is removed from the checking account and transferred to a vendor.

In some instances, the at least one processing circuit 114 may determine that an available amount corresponding to at least one transaction instrument of the user is below a transaction amount (e.g., an action amount, etc.) associated with the prospective action. In some instances, the available amount may be a maximum amount of the at least one transaction instruments available for the prospective transaction. For example, the available amount of a bank account may be an amount of money held in the bank account and the available amount of a credit card may be difference between a balance of the credit card and a maximum balance of the credit card. In other instances, the user of the user device 140 may set the available amount. For example, the user of the user device 140 may set the available amount to be $1000.

Subsequently, the at least one processing circuit 114 may perform a search for a sponsorship opportunity (e.g., a loan opportunity, etc.) for the user corresponding to the prospective transaction. The sponsorship opportunity may allow for the user to satisfy the at least one action requirement and complete the prospective action. In some instances, the at least one processing circuit 114 may perform the search for the sponsorship opportunity based on the action data and the user data. For example, the at least one processing circuit 114 may perform the search for a loan for the user corresponding to the prospective action based on an amount of the prospective action included in the action data and a credit score of the user included in the user data. In some instances, the provider associated with the provider system 108 may preauthorize the user for a sponsorship opportunity up to a sponsorship threshold, such that the at least one processing circuit 114 does not need to perform the search for the sponsorship opportunity and can offer the sponsorship opportunity up to the sponsorship threshold to the user.

In some instances, the provider system 108 may include the information to perform the search for the sponsorship opportunity or the modeler circuit 124 may receive additional search data associated with the sponsorship opportunity from a different source (e.g., the external provider system 135, the third-party data sources 170, etc.). For example, if the provider associated with the provider system 108 may be able to offer the sponsorship opportunity to the user to complete the prospective action, then the provider via the provider system 108 may include the information to perform the search for the sponsorship opportunity. As another example, if a first provider (e.g., a first bank, etc.) is associated with the provider system 108 and the first provider is not able to offer the sponsorship opportunity to the user to complete the prospective action, then the provider system 108 may receive additional search data associated with the sponsorship opportunity from the external provider system 135 associated with a second provider (e.g., a second bank, etc.) that is able to offer the sponsorship opportunity to the user to complete the prospective action.

In some instances, the at least one processing circuit 114 is configured to generate result data specific to the user for the search for the sponsorship opportunity. The result data may include at least one prospective sponsor offering the sponsorship opportunity to the user to complete the prospective action. In some instances, one of the prospective sponsors may be the provider of the provider system 108. The prospective sponsor may also be one of the providers of the external provider systems 135, or another type of prospective sponsor (e.g., a government agency, a peer to peer sponsor, a private sponsor, etc.). For example, the result data may include a first bank offering a first loan to the user corresponding to the prospective action and a second bank offering a second loan to the user corresponding to the prospective action. As another example, the result data may include a flex loan from the provider of the provider system 108 for the user corresponding to the prospective action. In other instances, the result data does not include any prospective sponsors for the prospective action. For example, if the user does not qualify for a loan based on the credit score of the user included in the user data, the search for the sponsorship opportunity may not discover any prospective sponsors for the loan.

In some instances, the at least one processing circuit 114 is configured to facilitate a transaction associated with the sponsorship opportunity between the user and the prospective sponsor for the prospective action based on the result data. For example, the at least one processing circuit 114 may facilitate a transaction of a loan between the user and a provider of the provider systems 108 based on the provider of the provider systems and the loan being included in the result data. In some instances, the at least one processing circuit 114 is configured to facilitate the transaction between the user and the prospective sponsor based on receiving an authorization from the user authorizing the transaction between the user and the prospective sponsor. For example, the image processing system 110 may receive an authorization from the user through the input/output device 132 and may then facilitate the transaction associated with the sponsorship opportunity between the user and the prospective sponsor for the prospective action based on the result data.

In some instances, the at least one processing circuit 114 is configured to generate one or more action instructions based on the action data. The one or more action instructions may include a process for a user of the user device 140 to complete the prospective action. For example, if the prospective action requires the user to fill out an online application to complete the prospective action, the action instructions may include a process that the user would need to follow to fill out the online application. As another example, if the user cannot currently afford to complete the prospective action, the action instructions may include a process that the user would need to follow in order to save up enough to be able to afford to complete the prospective action. In some instances, the prospective instructions may include goals that the user would need to achieve in order to complete the prospective action. For example, if the prospective action is associated with purchasing a house, the prospective instructions may include a savings goal that the user would need to reach in order to be able to afford to complete the prospective action associated with purchasing the house.

In some instances, the at least one processing circuit 114 is configured to share the action instructions between a first of the user devices 140 associated with the user and a second of the user devices 140 associated with a second user. For example, if the user and the second user are working together to complete the prospective action, the action instructions may be shared between the first of the user devices 140 associated with the user and the second of the user devices 140 associated with the second user such that the user and the second user can collectively monitor the action instructions. Additionally, when the action instructions include the goals, the user and the second user can collectively monitor the goals of the prospective instructions in order to monitor their progress towards achieving the goals and being able to complete the action transaction.

In some instances, the at least one processing circuit 114 is configured to generate reward data associated with the user device 140 based on the image data acquired from the user device 140. For example, the provider of the provider system 108 may operate a rewards program associated with the image processing system 110 in order to motivate users to utilize the image processing system 110. For example, the at least one processing circuit 114 may be configured to generate the reward data associated with the user device 140 that includes a point value assigned to the user device 140 based on a number of times that the image processing system 110 received image data from the user device 140.

In some instances, the object depicted in the image may be a second user and the prospective action may be performed by the user and correspond with the second user. For example, the user device 140 may be associated with a first user with a first exchange instrument, the image data may be associated with an object corresponding to a second user (e.g., a face of the second user, etc.) and include an indication that the second user has access to a second transaction instrument, and the user data may include an indication that the first user has access to the first transaction instrument. The at least one processing circuit 114 can model the image data with the user data to generate the action data corresponding to a prospective transition between the first user and the second user to exchange an amount between the first transaction instrument of the first user and the second transaction instrument of the second user. The amount included in the action data may be generated by the at least one processing circuit 114 based on the user data relating to the first user, the image data relating to the second user, or the amount may be inputted by the user of the user device 140.

In some instances, the process of generating, identifying, or modeling can include using techniques such as machine learning, statistical analysis, and pattern recognition to establish relationships between data and generate resulting data based on those relationships. For example, the at least one processing circuit 114 of the image processing system 110 may utilize techniques such as machine learning, statistical analysis, and pattern recognition to determine information and generate data as described herein. In some embodiments, modeling can begin with the selection of an appropriate model based on the data. It should be understood that the term modeling herein encompasses a wide range of techniques and approaches aimed at understanding relationships within data. This could include anything from statistical methods and rule-based systems to machine learning algorithms, depending on the nature of the data. Thus, modeling involves selecting techniques based on the specific characteristics of the data, ensuring that the chosen method or methods accurately captures relationships.

In some instances, the model parameters can be trained and optimized using the cleaned, classified, and linked data. This training process can include using algorithms to adjust the model parameters such that the error between the model's predictions and the actual outcomes is minimized. The modeling process can also include feature engineering, which is the process of creating new features or modifying existing ones to improve the model's power. For example, instead identifying multiple objects within the image acquired from the user device, a feature that sets a limit of one object if the object is a QR code might result in a more efficient model due to the face that other objects within the image will most likely be related to the QR code if the QR code is within the image.

Once one or more models or techniques are trained and/or optimized, the at least one processing circuit 114 of the image processing system 110 can use the model to generate data. The data could be a mathematical representation, a decision tree, a set of rules, or any other structure that captures the relationships between different data points. Moreover, the modeling process can include various safeguards to ensure privacy and security of user data (e.g., anonymizing the data).

In some embodiments, the at least one processing circuit 114 can use rule-based systems to model the data and the parameters. Rule-based systems can be where predefined rules are created by the at least one processing circuit 114 (or domain experts) to infer outcomes based on given conditions. For example, if a credit card always gives 2% cash back on all transactions completed with the credit card and a checking account that does not give any cash back on any transactions completed with the checking account, a rule might state completing prospective transactions with the credit card always has a higher value (e.g., a value offset of 2% of the transaction amount of the transaction, etc.) than completing transactions with the checking account. This rule can then be applied to the process to limit the process to generating the value offset between transactions completed with the credit card and transactions completed with the checking account.

Once the at least one processing circuit 114 of the image processing system 110 has generated the action data specific to the user for satisfying the action requirement to complete the prospective action, the at least one processing circuit 114 may augment the image capture graphical user interface of the client application by including the action data overlaid over the image data, at step 310. The augmentation to the image capture graphical user interface may include overlaying the action data specific to the user over the image data including the at least one object to provide simultaneous viewing of the at least one object with the action data specific to the user. The image capture graphical user interface may be provided by the user client application 154 and may be augmented through the user client application 154. For example, the image capture graphical user interface of the user client application 154 may include the image associated with the image data and the at least one processing circuit 114 may augment the image capture graphical user interface to overlay the action data over the image associated with the image data. For example, the at least one processing circuit 114 may augment the image capture graphical user interface to provide an augmented reality to the user, where the augmented reality includes the action data overlaid over the image and the image depicts the surroundings of the user. As such, the user may visualize the action data overlaid over the surroundings of the user in the image capture graphical user interface and may make decisions associated with objects in the surroundings of the user based on the action data overlaid over the surroundings.

In some instance, prior to augmenting the image capture graphical user interface of the client application by including the action data overlaid over the image data, the at least one processing circuit 114 may augment the image capture graphical user interface to overlay an intermediate element indicating data processing over the image data including the at least one object. Then, when the at least one processing circuit 114 augments the image capture graphical user interface of the client application by including the action data overlaid over the image data, the action data specific to the user may replace the intermediate element.

In some instances, the at least one processing circuit 114 may augment the image capture graphical user interface by including the value offset. The augmentation to the image capture graphical user interface may overlay the value offset over the image data including the at least one object to provide simultaneous viewing of the at least one object with the value offset. For example, the at least one processing circuit 114 may augment the image capture graphical user interface to include a value offset element indicating the value offset overlayed over the image data. The element indicating the value offset may be text, a bar graph, or a pie chart indicating the variation between exchanging the second amount with the second transaction instrument during the prospective action and exchanging the first amount with the first transaction instrument during the prospective action. In some instances, the element indicating the value offset may include a recommendation for the user to complete the prospective action with the first transaction instrument or the second transaction instrument based on whether exchanging the first amount with the first transaction instrument during the prospective action has a higher value than exchanging the second amount with the second transaction instrument during the prospective action or not. For example, the element may include a recommendation for the user to complete the prospective action with the first transaction instrument if exchanging the first amount with the first transaction instrument during the prospective action has a higher value than exchanging the second amount with the second transaction instrument during the prospective action. In some instances, the at least one processing circuit 114 may augment the image capture graphical user interface to include elements indicating each of the transaction instruments included in the user data relating to the value offset (e.g., a first transaction instrument, a second transaction instrument, a third transaction instrument, etc.). In some instances, the augmentation may result in the image capture graphical user interface providing simultaneous viewing of the at least one object with the value offset and the action data.

Furthermore, in some instances, the elements indicating the transaction instruments that relate to the value offset included in the image capture graphical user interface may be arranged within the image capture graphical user interface based on their estimated relevance to the user. For example, in some instances, while augmenting the image capture graphical user interface the at least one processing circuit 114 is configured to estimate the most relevant and/or useful of the transaction instruments for inclusion within the interface using one or more machine learning models of the at least one processing circuit 114. In some instances, the at least one processing circuit 114 may train the one or more machine learning models to identify the most relevant and/or useful combinations of the transaction instruments for inclusion using various training data. The training data may include historical usage of similar transaction instruments by users for actions similar to the prospective action. In some instances, the training data may be data compiled over time from a variety of users associated with the provider and stored within a database associated with the external provider systems 135.

Accordingly, once the one or more machine learning models have been trained, the at least one processing circuit 114 may apply the historical usage of similar transaction instruments and the user data relating to the user associated with the user device 140 to one or more machine learning models to identify the most relevant and/or useful of the transaction instruments for inclusion in the image capture graphical user interface. The at least one processing circuit 114 may further arrange the elements indicating the transaction instruments specifically according to their estimated relevance to the prospective action during the augmentation of the image capture graphical user interface. For example, in some instances, the most relevant elements may be arranged in a foreground of the image capture graphical user interface. The elements may then be arranged behind the most relevant elements, with the least relevant elements arranged further behind the most relevant elements. In some instances, the at least one processing circuit 114 is configured to utilize various feedback information (e.g., transaction instruments actually used by the user) received from the user (e.g., via the user device 140) to retrain or otherwise update the one or more machine learning models. Accordingly, in some instances, the at least one processing circuit 114 may further augment the image capture graphical user interface to rearrange the elements on the image capture graphical user interface based on the updated machine learning models and their associated outputs.

In some instances, the at least one processing circuit 114 may augment the image capture graphical user interface by including the result data specific to the user for the search for the sponsorship opportunity. The augmentation to the image capture graphical user interface may overlay the result data over the image data including the at least one object to provide simultaneous viewing of the at least one object with the result data. For example, the augmentation of the image capture graphical user interface may result in a name of a bank that is offering a loan to the user in order for the user to satisfy the at least one action requirement and complete the prospective action may be overlaid on top of the image included in the image data.

In some instances, the at least one processing circuit 114 may augment the image capture graphical user interface by including the one or more action instructions. The augmentation to the image capture graphical user interface may overlay the one or more action instructions over the image data including the at least one object to provide simultaneous viewing of the at least one object with the one or more action instructions. For example, the augmentation of the image capture graphical user interface may result in the action instructions may include that the user needs to fill out a form and deliver the form to a vendor in order to complete a prospective action with the vendor being overlaid on top of the image included in the image data.

Referring now to FIG. 3, a flowchart for a method 320 displaying an image capture graphical user interface is shown, according to some embodiments. The user device 140 can be configured to perform the method 320. For example, the user client application 154 of the user device 140 may generate and or provide the image capture graphical user interface. Further, the image capture graphical user interface of the method 320 may be accessible by the user device 140 (e.g., through the user client application 154, etc.).

The method 320 begins with the user device 140 receiving an indication of a log-in into a client application associated with a provider institution, at step 322. The indication of the log-in may be inputted by a user of the user device 140 into the user client application 154 executed by the user device 140. In some instances, the indication of the log-in is subsequently provided to the image processing system 110 of the provider system 108.

Once the user device 140 has provided the indication of the log-in into the client application associated with the provider institution, the user device 140 may launch the image capture graphical user interface, at step 324. In some instances, the image capture graphical user interface may be executed by the user client application 154 of the user device 140. The image capture graphical user interface may display image data associated with an image acquisition device of the user device 140. For example, the image capture graphical user interface may display a live image from a camera of the user device 140. In some instances, the image capture graphical user interface may include a reticule highlighting at least one object depicted in the live image from the camera of the user device 140.

Once the user device 140 has launched the image capture graphical user interface, the user device 140 may provide image data associated with an image depicting at least one object and user data relating to a user to the image processing system 110 of the provider institution, at step 326. For example, the image data may be associated with a photograph taken by the camera of the user device 140 or the image data may be associated with a live preview of a view of the camera of the user device 140 before a photograph is taken. The at least one object depicted in the image may be a house, a grocery item, a person, a QR code, or any other object. In some instances, the user device 140 may identify the at least one object depicted in the image using image processing techniques prior to providing the image data and the image data may include the identification of the at least one object depicted in the image. In other embodiments, the user device 140 may provide the image data associated with the image to the image processing system 110 without identifying the at least one object such that the image processing system 110 identifies the at least one object depicted in the image during the image processing analysis performed by the image processing system 110. In some instances, the user data may be stored by the user client application 154 of the user device 140 and may relate to the user associated with the user device 140. The user data may include information related to the user's accounts maintained with the provider institution of the provider system 108.

Once the user device 140 has provide image data associated with an image depicting at least one object and user data relating to a user to the image processing system 110 of the provider institution, the user device 140 may receive an augmentation to the image capture graphical user interface that includes action data specific to the user for satisfying at least one action requirement to complete a prospective action associated with the at least one object, at step 328. The augmentation to the image capture graphical user interface overlays the action data specific to the user over the image data including the at least one object to provide simultaneous viewing of the at least one object with the action data specific to the user.

Figure 4:
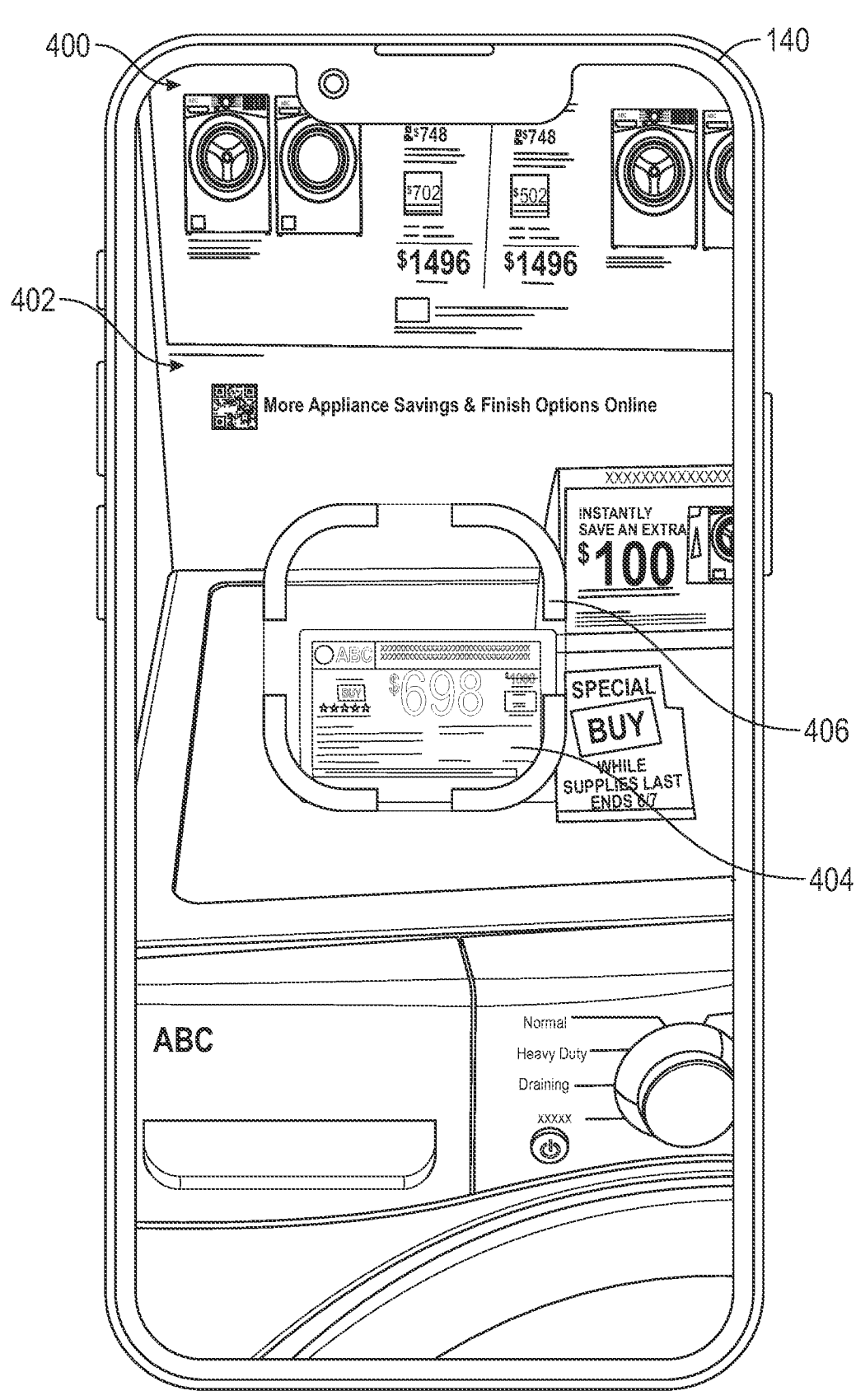
FIG. 4 is an illustration of a configuration of a graphical user interface generated by the image processing system of FIG. 1, according to example embodiments.

Referring now to FIG. 4, an illustration of a configuration of a user interface 400 on the user device 140 is shown. The user interface 400 may be presented within the user client application 154. In some embodiments, the user interface 400 is generated and provided by the content control circuit 128 and transmitted to the user device 140 to be displayed to a user.

As illustrated, the user interface 400 includes a camera graphical interface 402, an object 404, and a target icon 406. The camera graphical interface 402 displays an image acquired by a camera of the user device 140. In some instances, the image displayed by the camera graphical interface 402 is a part of an image feed (e.g., of a video, etc.). For example, the image displayed by the camera graphical interface 402 may correspond to an environment positioned in front of the camera at the same time that the camera graphical interface 402 is displaying the image. In some embodiments, the camera graphical interface 402 may display a previous image that was previous obtained by the camera of the user device 140 or an external image that was acquired by the user device 140 from an external source.

The image displayed by the camera graphical interface 402 includes the object 404. The object 404 may be a physical item positioned in a field of view of the camera of the user device 140. For example, the object 404 may be a house, a QR code, a price tag, an appliance, or any other object that may be processed using the image processing analysis. In some instances, the image displayed by the camera graphical interface 402 includes more than one of the objects 404.

The target icon 406 is a reticle indicating the position of the object 404 on the camera graphical interface 402. For example, the target icon 406 may outline the object 404 on the camera graphical interface 402 to indicate the position of the object 404. In some instances, multiple of the target icons 406 may indicate the position of each of the objects 404 displayed on the camera graphical interface 402. In some instances, the target icon 406 may indicate that the user should zoom in the camera on the object 404, move the camera toward the object 404, zoom out the camera away from the object 404, or move the camera away from the object 404 in order to make the image clearer so that the object 404 clearly identified for the image processing analysis. For example, the target icon 406 may include text indicating that user should zoom in the camera (e.g., "Zoom In"), move the camera toward the object 404 (e.g., "Move Closer"), zoom out the camera (e.g., "Zoom Out", or move the camera away from the object 404 (e.g., "Move Further Away"). As another example, the target icon 406 may change colors based on the position of the camera relative to the object. The target icon 406 may be red if the camera is too far away from the object 404, purple if the camera is the right distance away from the object 404, and yellow if the camera is too close to the object 404.

Figure 5:
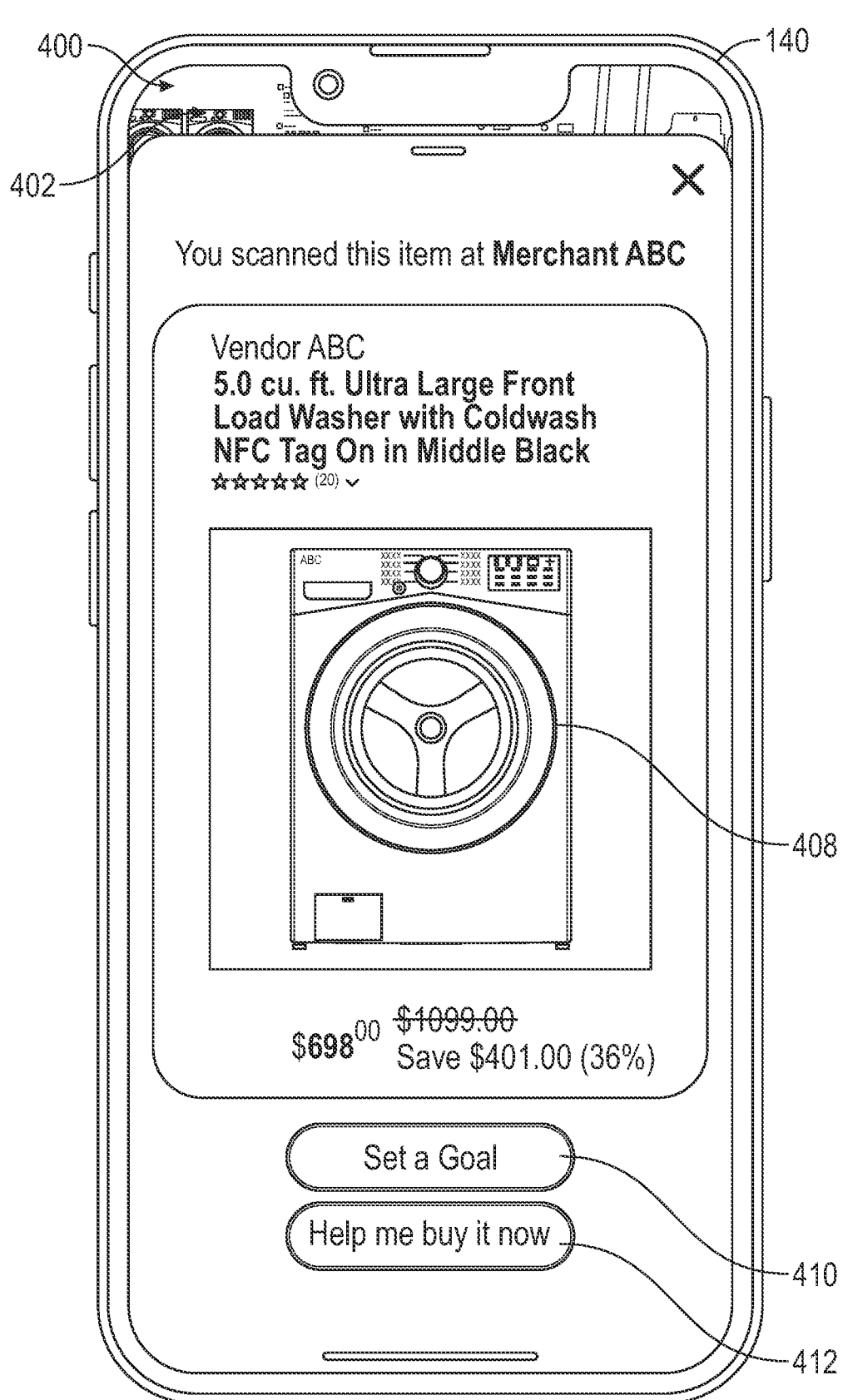
FIG. 5 is an illustration of a configuration of a graphical user interface generated by the image processing system of FIG. 1, according to example embodiments.

Referring now to FIG. 5, an illustration of a configuration of the user interface 400 on the user device 140 is shown. As illustrated, the user interface 400 includes the camera graphical interface 402, an object element 408, a goal actionable item 410, and a loan actionable item 412. As shown in FIG. 5, the object element 408 is overlaid on top of the camera graphical interface 402. In other instances, the object element 408 is takes up an entirety of the user interface 400 (e.g., the object element 408 is not overlaid on top of the camera graphical interface 402, etc.). The object element 408 includes content related to the object 404. For example, the object element 408 may include an image associated with the object 404, a description associated with the object 404, a user rating associated with the object 404, a valuation of the object 404, and/or a price of the object 404. In some instances, the object element 408 may include links that provide additional information when selected by the user of the user device. For example, if the user selects the user rating associated with the object 404, the user may be provided with user reviews associated with the object 404.

The goal actionable item 410 may be associated with the object 404 and the object element 408, discussed above. In some instances, the user may select the goal actionable item 410 in order to receive the one or more action instructions generated by the at least one processing circuit 114. For example, in some instances, the goal actionable item 410 may allow the at least one processing circuit 114 to generate the one or more action instructions and provide the instruction graphical interface to the GUI of the user device 140 such that the user is provided with the one or more instructions. In some instances, the one or more action instructions include the goals that the user would need to achieve in order to complete the prospective action.

The loan actionable item 412 may also be associated with the object and the object element 408, discussed above. In some instances, the user may select the loan actionable item 412 in order to receive the sponsor graphical interface corresponding to the at least one prospective sponsor. For example, in some instances, the loan actionable item 412 may allow the at least one processing circuit 114 to perform the search for the sponsorship opportunity for the user corresponding to the prospective action, generate the result data for the search for the sponsorship opportunity, and provide the sponsor graphical interface to the GUI of the user device 140 such that the user is provided with the at least one prospective sponsor for the prospective action.

Figure 6:
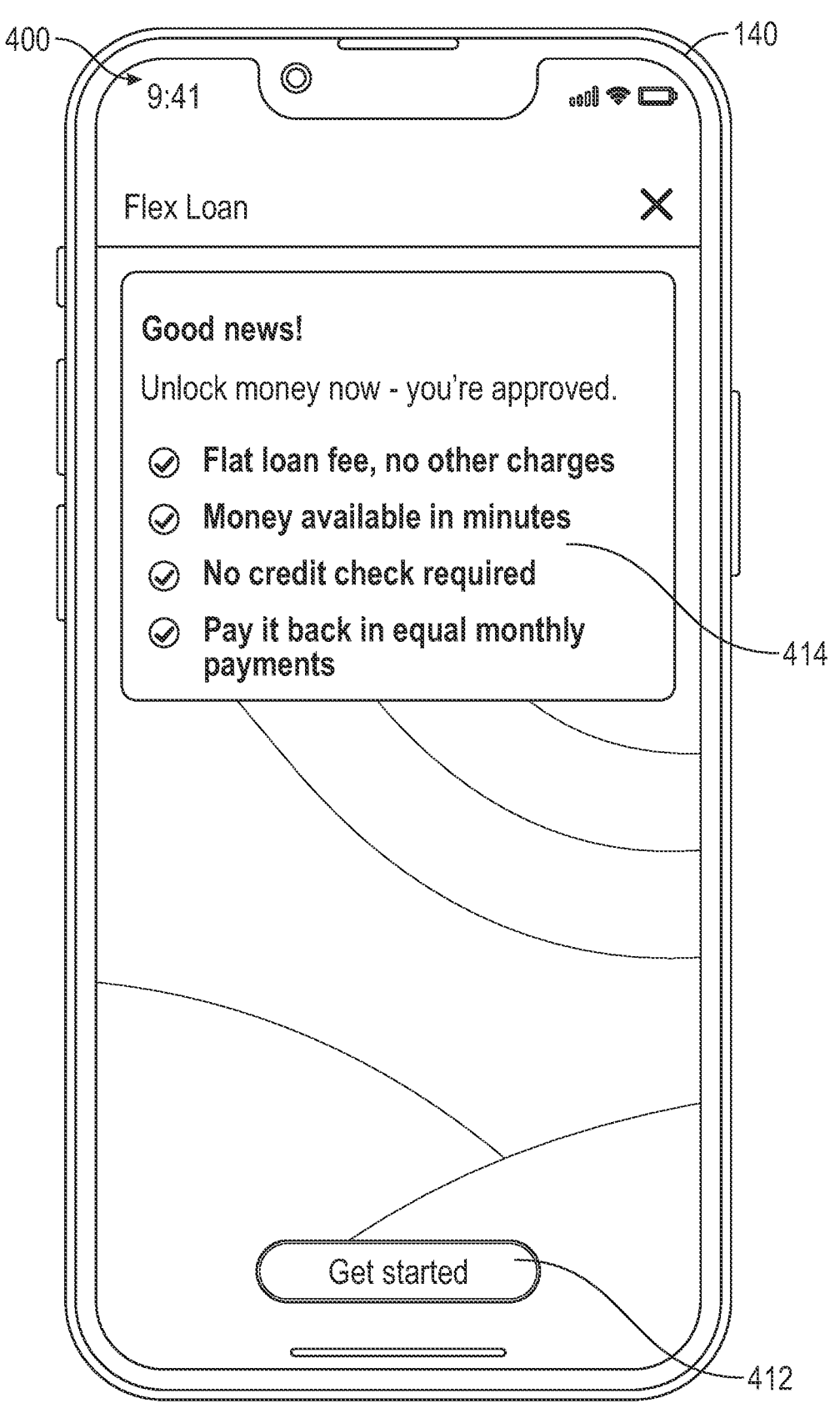
FIG. 6 is an illustration of a configuration of a graphical user interface generated by the image processing system of FIG. 1, according to example embodiments.

Referring now to FIG. 6, an illustration of a configuration of the user interface 400 on the user device 140 is shown. As illustrated, the user interface 400 includes the loan actionable item 412 and a loan element 414. The loan element 414 includes content related to the sponsorship opportunity for the user from the at least one prospective sponsor for the prospective action. For example, the loan element 414 may include an image associated with the sponsorship opportunity, a description associated with the sponsorship opportunity, and/or conditions associated with the sponsorship opportunity. In some instances, the loan element 414 may include links that provide additional information corresponding to the sponsorship opportunity when selected by the user of the user device.

Figure 7:
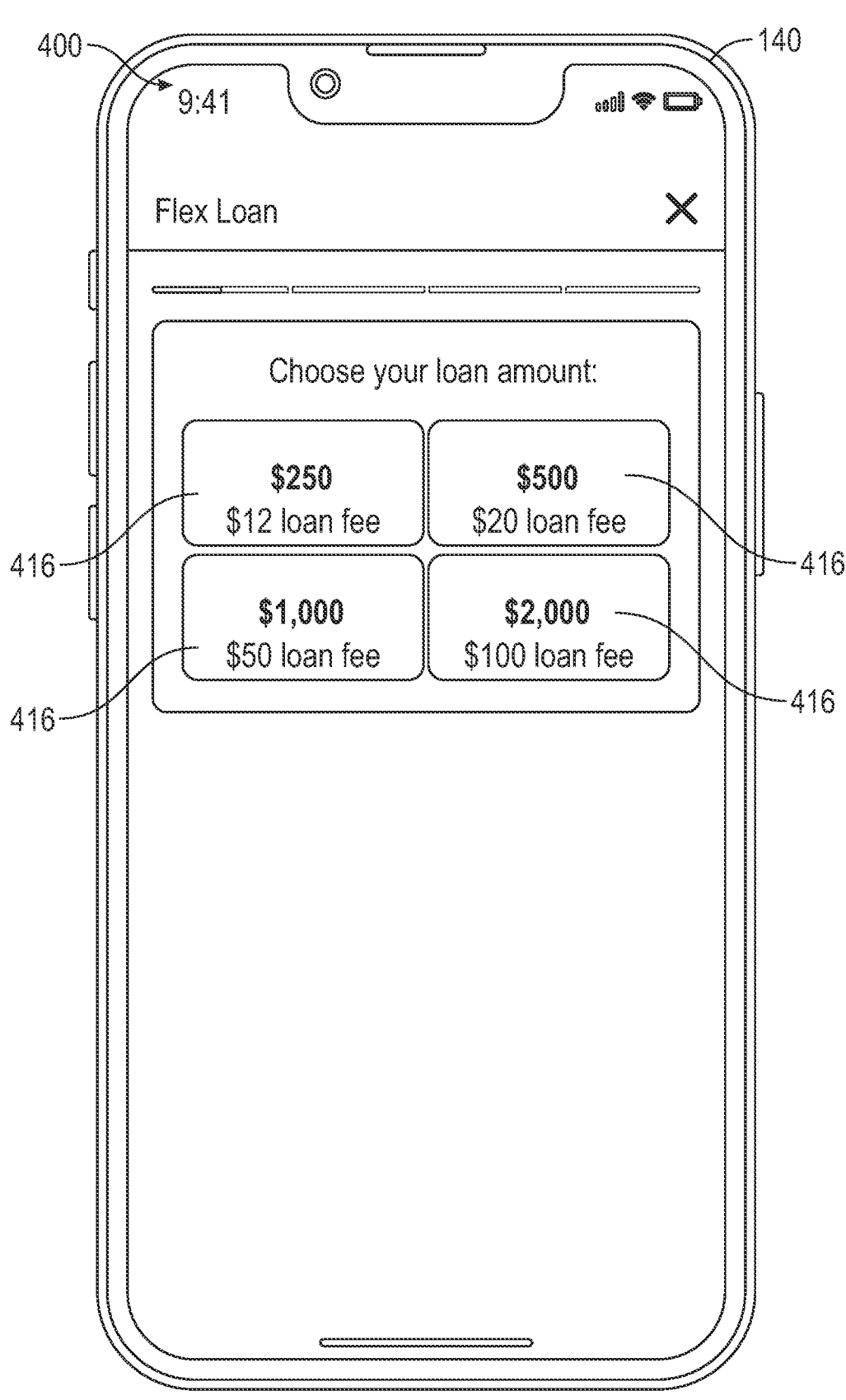
FIG. 7 is an illustration of a configuration of a graphical user interface generated by the image processing system of FIG. 1, according to example embodiments.

Referring now to FIG. 7, an illustration of a configuration of the user interface 400 on the user device 140 is shown. As illustrated, the user interface 400 includes loan selection actionable items 416. The loan selection actionable items 416 may correspond with the sponsorship opportunity from the at least one prospective sponsor for the prospective action. For example, each of the loan selection actionable items 416 may correspond with one of the sponsorship opportunities from the at least one prospective sponsor for the prospective action. As shown in FIG. 7, a first of the loan selection actionable items 416 corresponds with a $250 loan, a second of the loan selection actionable items 416 corresponds with a $500 loan, a third of the loan selection actionable items 416 corresponds with a $1000 loan, and a fourth of the loan selection actionable items 416 corresponds with a $2000 loan. As another example, each of the loan selection actionable items 416 may correspond with sponsorship opportunities from different perspective sponsors. For example, a first of the loan selection actionable items 416 may correspond with a $250 loan from a first prospective sponsor and a second of the loan selection actionable items 416 may correspond with a $250 loan from a second prospective sponsor. In some instances, the user may select one of the loan selection actionable items 416 to receive additional information about the sponsorship opportunity associated with the one of the loan selection actionable items 416 that was selected. In some instances, each of the loan selection actionable items 416 may include content relating to the associated sponsorship opportunity. For example, each of the loan selection actionable items 416 may include text indicating a fee associated with each of the associated sponsorship opportunities.

Figure 8:
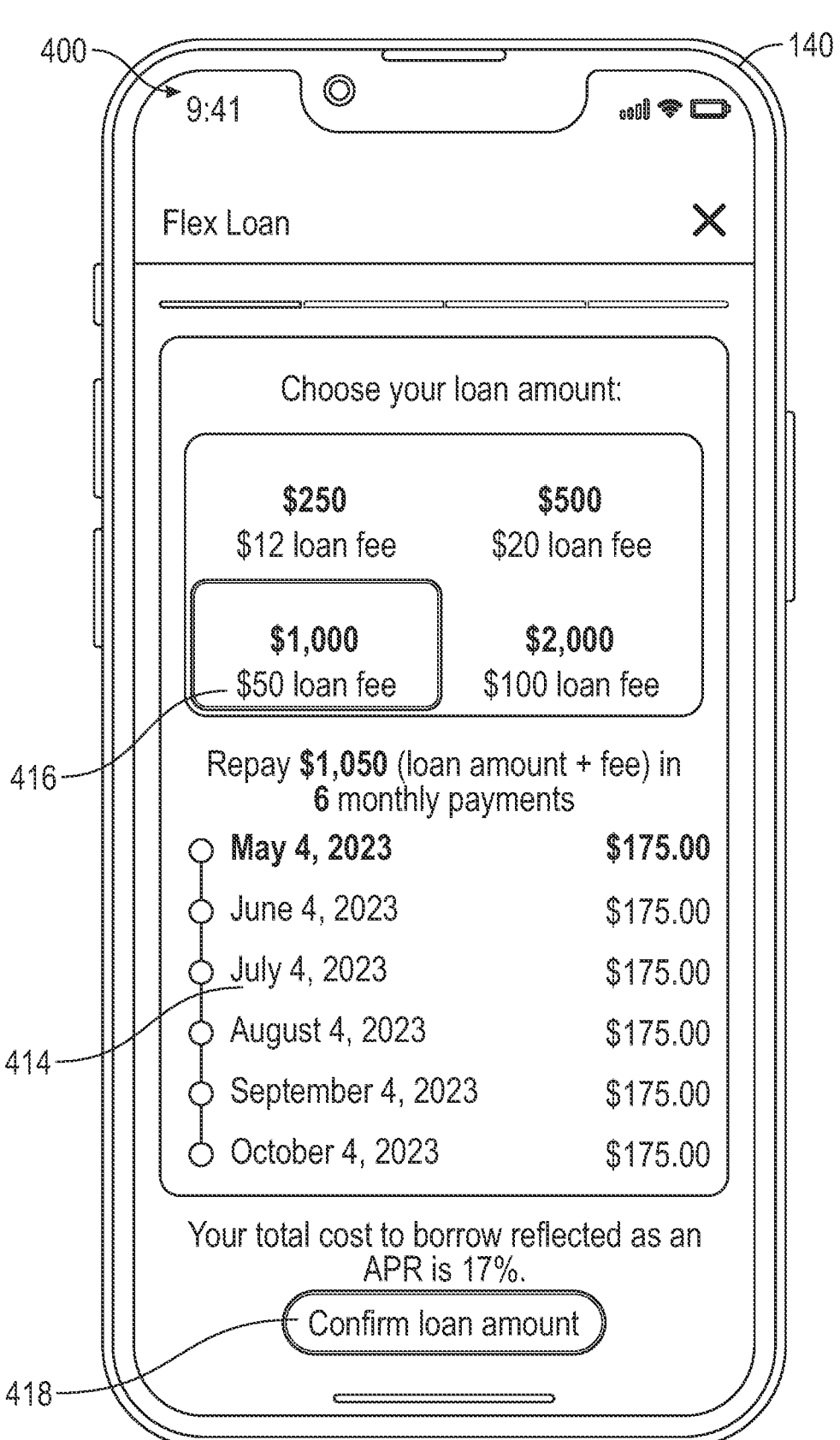
FIG. 8 is an illustration of a configuration of a graphical user interface generated by the image processing system of FIG. 1, according to example embodiments.

Referring now to FIG. 8, an illustration of a configuration of the user interface 400 on the user device 140 is shown. As illustrated, the user interface includes the loan selection actionable items 416, the loan element 414, and loan confirmation actionable item 418. After the selection of one of the loan selection actionable items 416, the loan element 414 may display additional content related to the sponsorship opportunity associated with the one of the loan selection actionable items 416 that was selected. The loan confirmation actionable item 418 may correspond with the sponsorship opportunity associated with the one of the loan selection actionable items 416 that was previously selected. In some instances, the user may select the loan confirmation actionable item 418 to complete a transaction between the prospective sponsor and the user associated with the sponsorship opportunity that corresponds with the one of the loan selection actionable items 416 that was previously selected. For example, in some instances, the loan confirmation actionable item 418 may allow for the at least one processing circuit 114 to facilitate a transaction between the user and the at least one prospective sponsor associated with the sponsorship opportunity for the prospective action, such that the user receives the transaction and is able to complete the prospective action.

Figure 9:
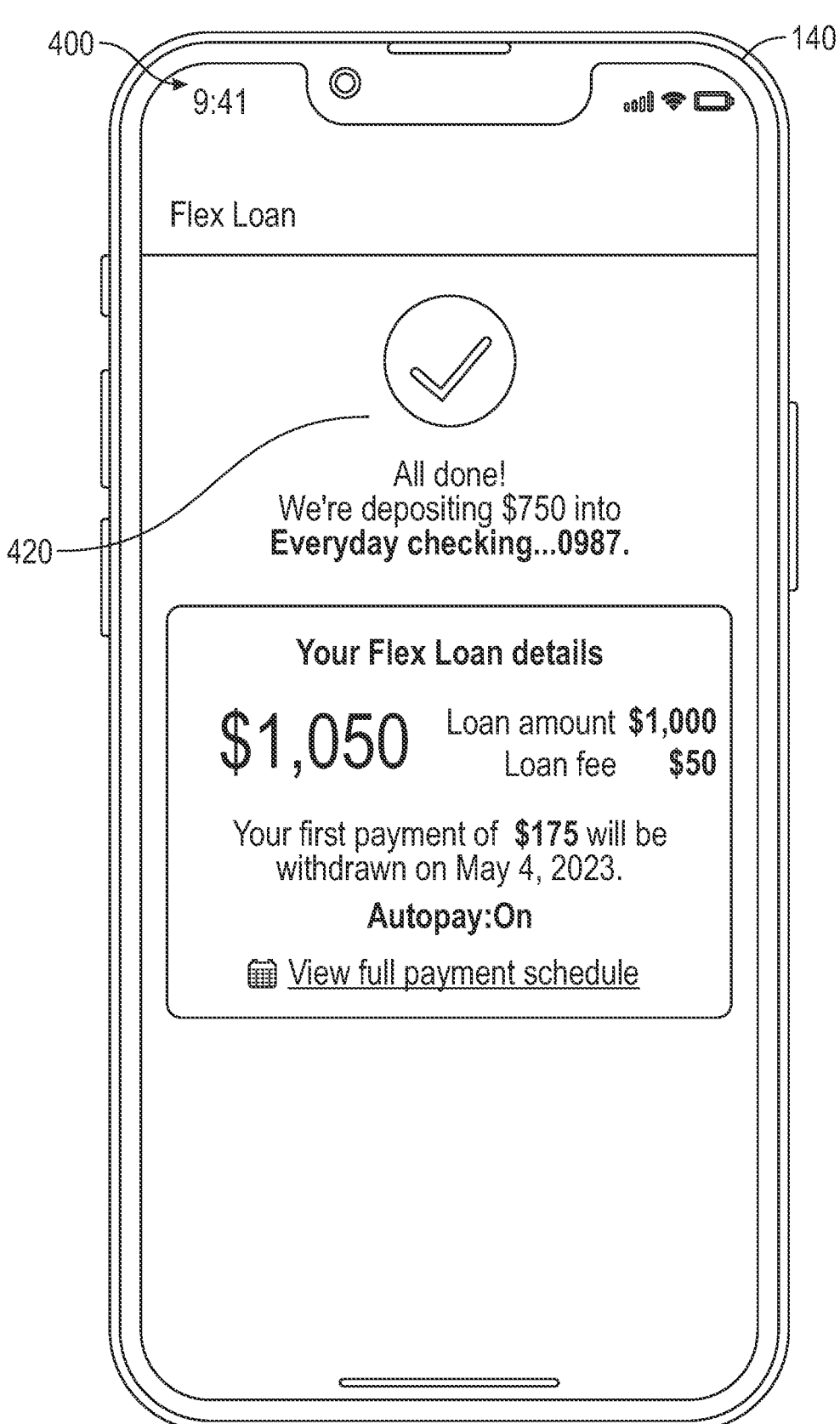
FIG. 9 is an illustration of a configuration of a graphical user interface generated by the image processing system of FIG. 1, according to example embodiments.

Referring now to FIG. 9, an illustration of a configuration of the user interface 400 on the user devices 140 is shown. As illustrated, the user interface 400 includes a loan confirmation element 420. The loan confirmation element 420 confirms that the transaction between the user and the at least one prospective sponsor associated with the sponsorship opportunity for the prospective action has been completed. In some instances, the loan confirmation element 420 also includes content related to the sponsorship opportunity for the prospective action that has been completed. For example, the loan confirmation element 420 may include an image associated with the sponsorship opportunity, a description associated with the sponsorship opportunity, terms of the sponsorship opportunity, an amount associated with the sponsorship opportunity, and/or conditions associated with the sponsorship opportunity.

Figure 10:
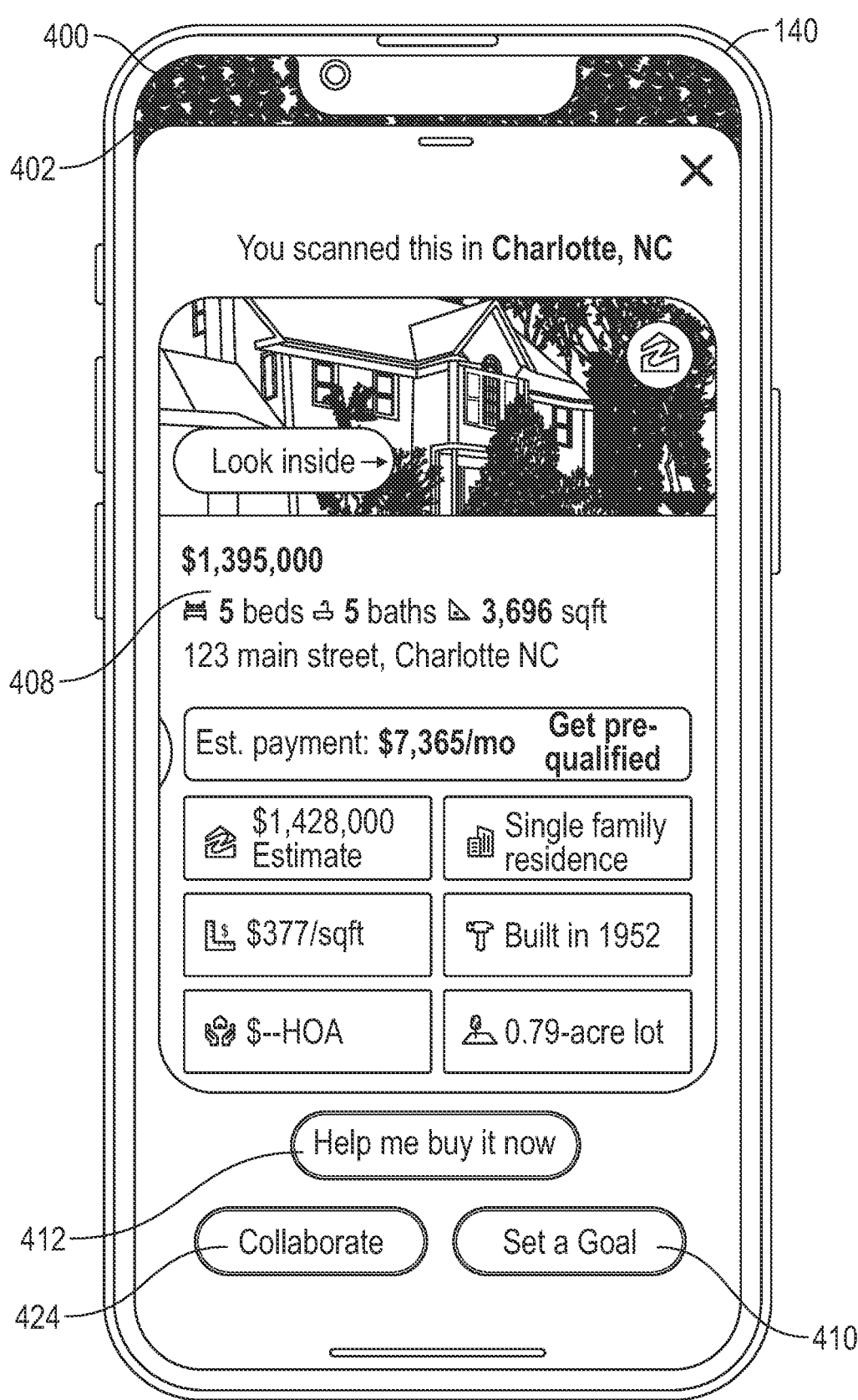
FIG. 10 is an illustration of a configuration of a graphical user interface generated by the image processing system of FIG. 1, according to example embodiments.

Referring now to FIG. 10, an illustration of a configuration of the user interface 400 on the user devices 140 is shown. As illustrated, the user interface 400 includes the camera graphical interface 402, the object element 408, the goal actionable item 410, the loan actionable item 412, and a collaborate actionable item 424. As shown in FIG. 10, the object element 408 is overlaid on top of the camera graphical interface 402 and includes content related to the object displayed on the camera graphical interface 402. For example, as shown in FIG. 10, the object displayed on the camera graphical interface 402 is a house and the object element 408 includes a valuation of the house, size details of the house, estimated payments relating to buying the house, and an image of the house. The collaborate actionable item 424 may be associated with the object related to the object element 408. In some instances, the user may select the collaborate actionable item 424 in order to share information corresponding to the object with another user (e.g., a second user of a second of the user devices 140, etc.). For example, in some instances, the collaborate actionable item 424 may allow for the at least one processing circuit 114 to provide the image capture graphical user interface to a second of the user devices 140 for a second user. In some instances, the user may select the collaborate actionable item 424 in order to receive the one or more action instructions generated by the at least one processing circuit 114 for both a first user associated with the user device 140 and a second user. For example, in some instances, the collaborate actionable item 424 may allow for the at least one processing circuit 114 to generate the one or more action instructions that include the goals that both the first user and the second user would need to achieve in order to complete the prospective action. For example, the collaborate actionable item 424 may allow for a first spouse to share the object associated with the object element 408 with a second spouse and allow for the at least one processing circuit 114 to generate the one or more action instructions that include the goals that the first spouse and the second spouse would need to collaboratively achieve to in order to complete the prospective action.

Figure 11:
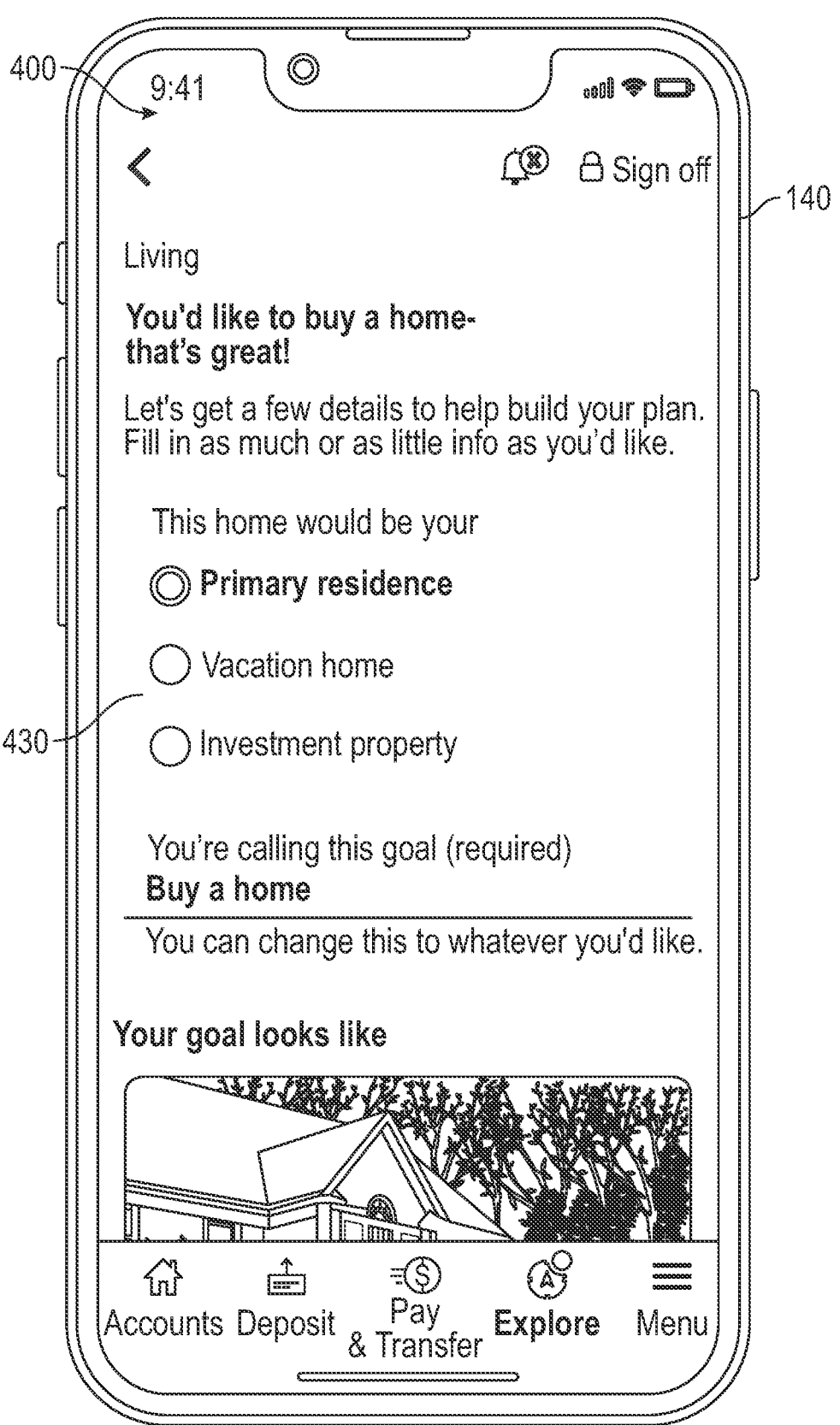
FIG. 11 is an illustration of a configuration of a graphical user interface generated by the image processing system of FIG. 1, according to example embodiments.

Referring now to FIG. 11, an illustration of a configuration of the user interface 400 on the user device 140 is shown. As illustrated, the user interface 400 includes a goal element 430. The goal element 430 includes content related to the one or more action instructions that include the goals that the user would need to achieve in order to complete the prospective action. For example, the goal element 430 may include an image of the object associated with the goal, a name of the goal, a category of the goal, a progress tracker for the goal, or other content associated with the goal. In some instances, the goal element 430 may include actionable items that are configured to allow the at least one processing circuit 114 to update the one or more action instructions that include the goal. For example, the goal element 430 may include check list that the user of the user device 140 may check off as the user completes the one or more action instructions to track the progress of the user through completing the one or more action instructions. As another example, the goal element 43 may include different goal category elements and the user may select one of the goal category elements in order to categorize the goal.

Figure 12:
FIG. 12 is an illustration of a configuration of a graphical user interface generated by the image processing system of FIG. 1, according to example embodiments.

Referring now to FIG. 12, an illustration of a configuration of the user interface 400 on the user device 140 is shown. As illustrated the user interface 400 includes a goal summary 432. The goal summary 432 includes content related to the one or more action instructions that include the goals that the user would need to achieve in order to complete the prospective action. For example, the goal summary 432 may include a list of the one or more action instructions. As another example, the goal summary 432 may include a goal amount associated with the goal and an image of the object associated with the goal.

Figure 13:
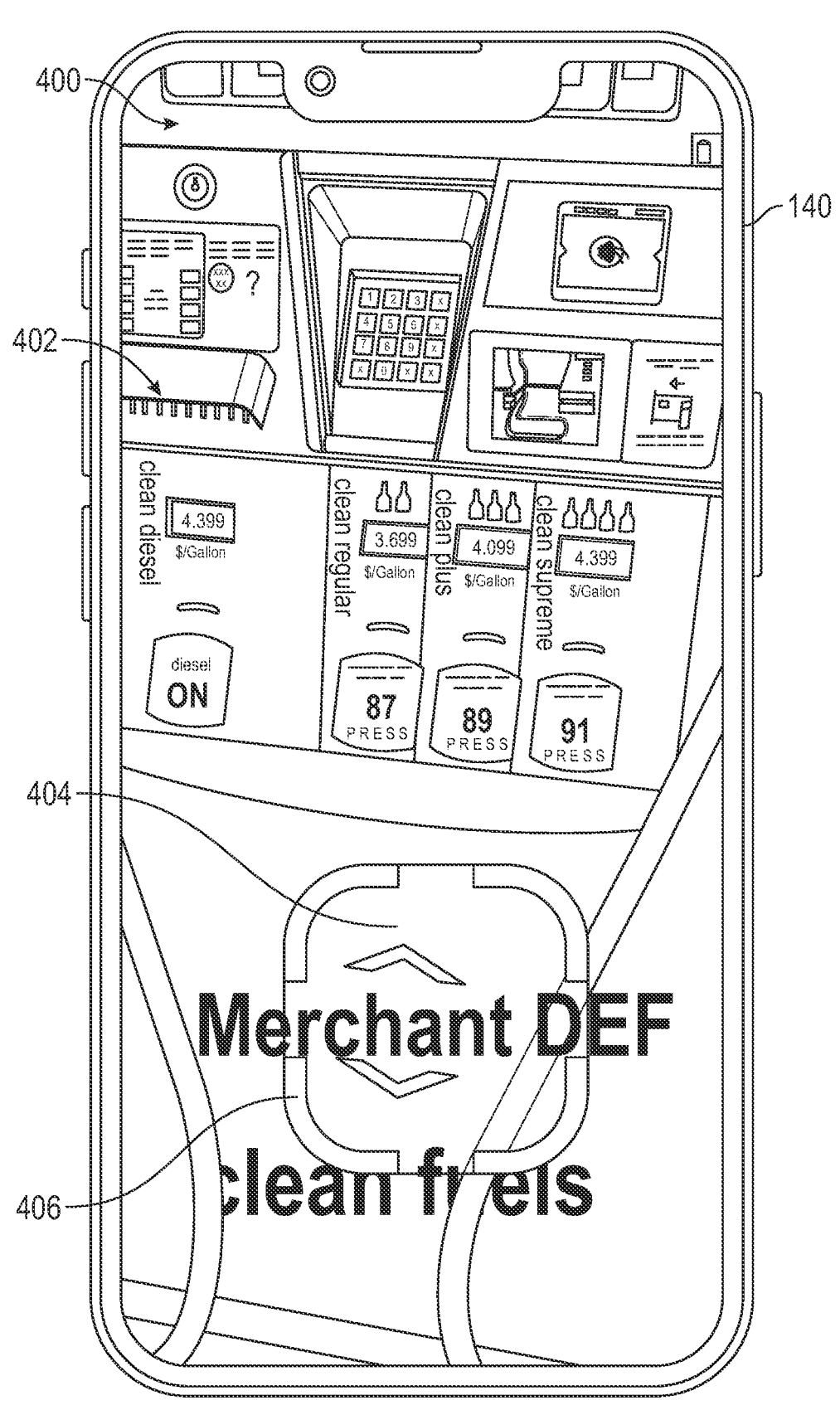
FIG. 13 is an illustration of a configuration of a graphical user interface generated by the image processing system of FIG. 1, according to example embodiments.

Referring now to FIG. 13, an illustration of a configuration of the user interface 400 on the user device 140 is shown. As illustrated, the user interface 400 includes the camera graphical interface 402, the object 404, and the target icon 406. As illustrated, the camera of the user device 140 is directed toward a gas pump and the object 404 is the gas pump. As an example, if the object 404 is the gas pump the projective action associated with the object 404 may be a transaction for gas.

Figure 14:
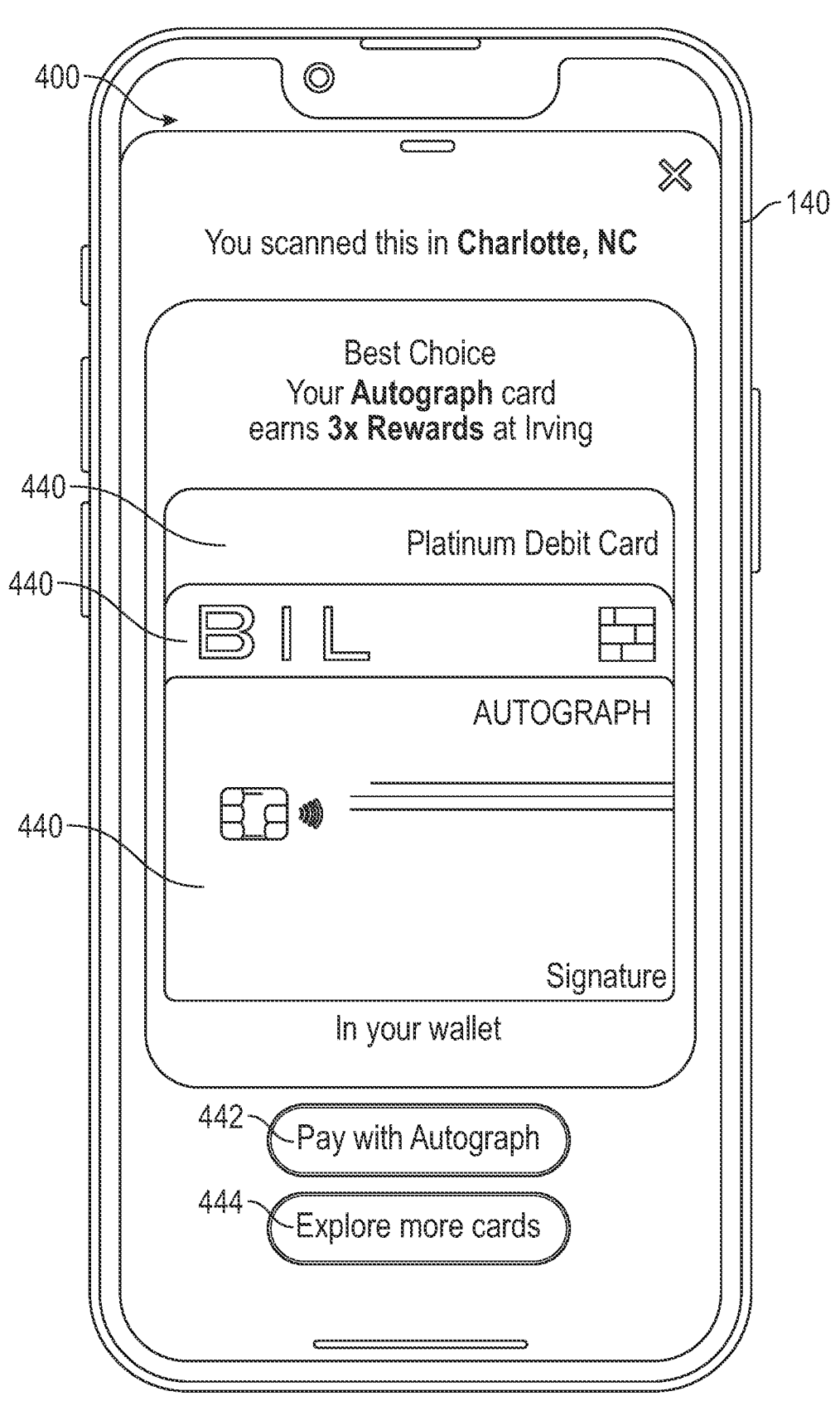
FIG. 14 is an illustration of a configuration of a graphical user interface generated by the image processing system of FIG. 1, according to example embodiments.

Referring now to FIG. 14, an illustration of a configuration of the user interface 400 on the user device 140 is shown. As illustrated, the user interface 400 includes a plurality of transaction instrument elements 440, a transaction actionable item 442, and an exploration actionable item 444. Each of the transaction instrument elements 440 corresponds to a transaction element associated with the user. For example, if the user has a first credit card, a second credit card, and a debit card, then the user interface 400 may include a first of the transaction instrument elements 440 corresponding with the first credit card, a second of the transaction instrument elements 440 corresponding with the second credit card, and a third of the transaction instrument elements 440 corresponding with the debit card.

In some instances, the transaction instrument elements 440 may include a variety of other text-based, color based, or symbol based indicators indicative of the value offset between each of the transaction instruments associated with the transaction instrument elements 440. In some instances, the transaction instrument elements 440 may vary based on the variation amount of the variation between using each of the transaction instruments to complete the prospective action. For example, the transaction instrument elements 440 may include one or more of a color-coded indicator (e.g., a red indicator indicates that the transaction instrument associated with the transaction instrument elements 440 would yield a lower value compared to other transaction instruments, a yellow indicator indicates that the transaction instrument associated with the transaction instrument elements 440 would yield an average value compared to other transaction instruments, a green indicator indicates that the transaction instrument associated with the transaction instrument elements 440 would yield a higher value compared to other transaction instruments, etc.), a predetermined shape-based symbol (e.g., a plus sign next to the transaction instrument elements 440 indicates that the transaction instruments would yield a higher value, an equal sign next to the transaction instrument elements 440 indicates that the transaction instruments would yield an average value, a minus sign next to the transaction instrument elements 440 indicates that the transaction instruments would yield a lower value, etc.), or any other suitable type of indicator. In some instances, the transaction instrument elements 440 may be arranged in the user interface 400 based on the variation amount of the variation between using each of the transaction instruments to complete the prospective action. For example, the transaction instrument elements 440 may be stacked with a first of the transaction instrument elements 440 associated with a first of the transaction elements that would yield a higher value when used to complete the prospective action in the front, a second of the transaction instrument elements 440 associated with a second of the transaction instruments that would yield an average value when used to complete the prospective action positioned behind the first of the transaction instrument elements 440, and a third of the transaction instrument elements 440 associated with a third of the transaction instruments that would yield a lower value when used to complete the prospective action positioned in the back (e.g., behind the first of the transaction instrument elements 440 and the second of the transaction instrument elements 440, etc.).

In some instances, the user may select the transaction actionable item 442 in order to initiate the prospective action associated with the object. For example, in some instances, the transaction actionable item 442 may allow the at least one processing circuit 114 to acquire a transaction request from a merchant computing system that includes transaction instrument of the prospective transaction. The transaction actionable item 442 may also allow the at least one processing circuit 114 to authorize the transaction request received from the merchant computing system. In some instances, the transaction actionable item 442 may be associated with the one of the transaction instruments with the highest value when the one of the transaction instruments is used to complete the prospective action. For example, the transaction actionable item 442 may allow the at least one processing circuit 114 to acquire a transaction request corresponding to the one of the transaction instruments with the highest value when the one of the transaction instruments is used to complete the prospective action.

In some instances, the user may select the exploration actionable item 444 in order to review the transaction instruments that do not have the highest value when the transaction instruments are used to complete the prospective action. For example, the exploration actionable item 444 may allow for the at least one processing circuit 114 to change the orientation of the transaction instrument elements 440 or include additional of the transaction instrument elements 440 that were not originally displayed on the user interface 400.

Figure 15:
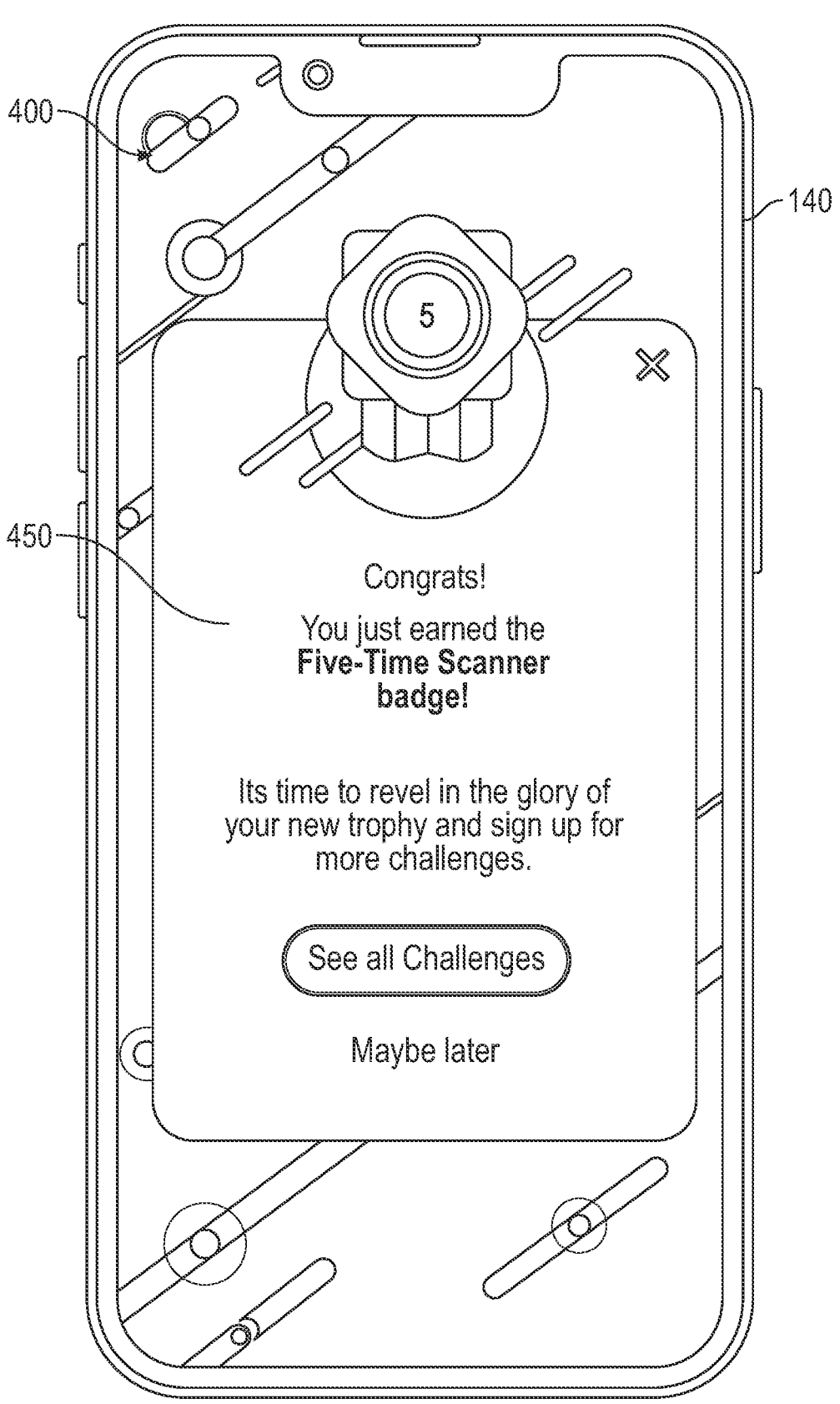
FIG. 15 is an illustration of a configuration of a graphical user interface generated by the image processing system of FIG. 1, according to example embodiments.

Referring now to FIG. 15, an illustration of a configuration of the user interface 400 on the user device 140 is shown. As illustrated, the user interface 400 includes a reward indicator 450. The reward indicator 450 may include content related to the reward data. For example, content included in the reward indicator 450 may include a point value assigned to the user device 140, a reward level assigned to the user device 140, a reward challenge, a description of the reward program associated with the image processing analysis, etc. In some instances, the reward indicator 450 may include actionable items that allow the at least one processing circuit 114 to display additional information correspond to the rewards program to the user of the user device 140.

Figure 16:
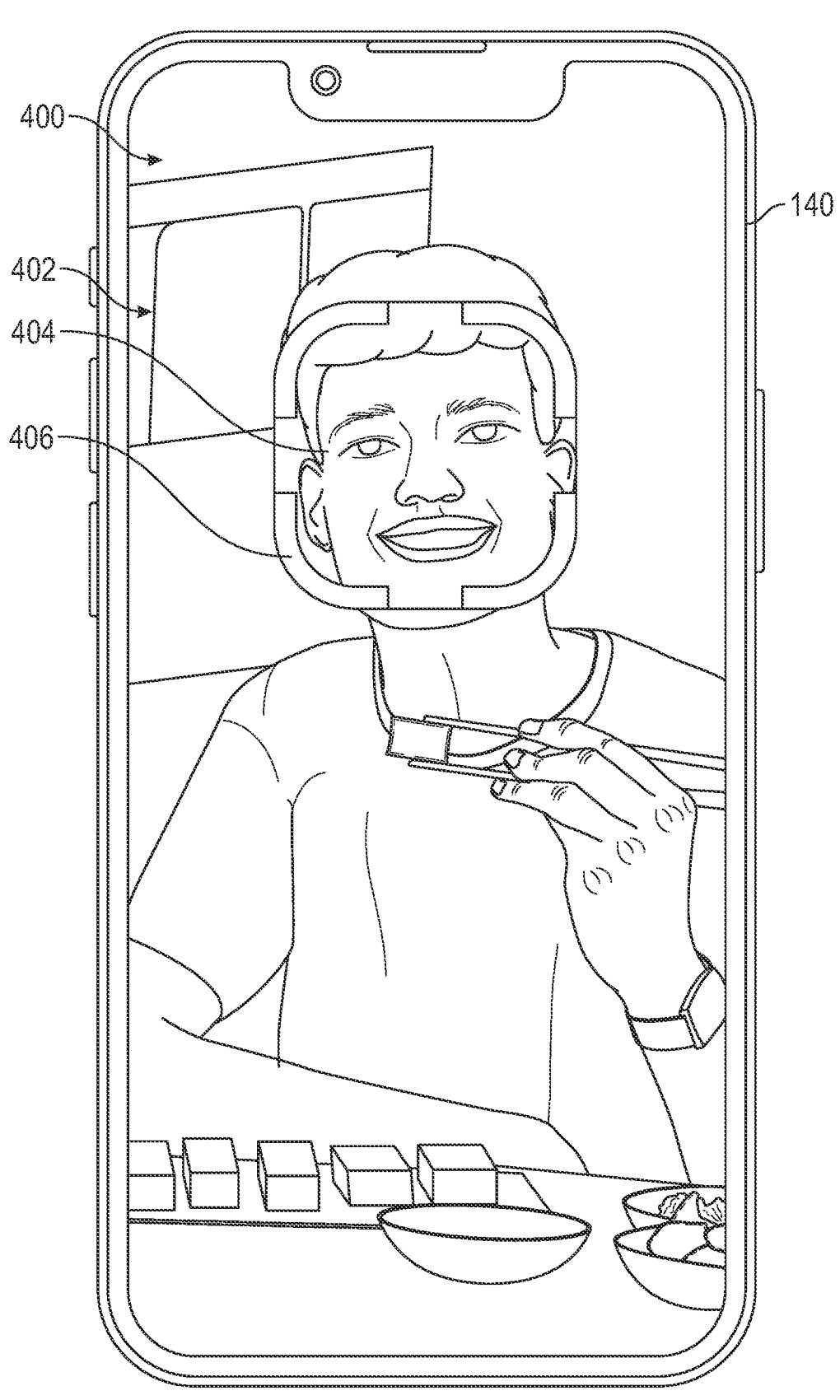
FIG. 16 is an illustration of a configuration of a graphical user interface generated by the image processing system of FIG. 1, according to example embodiments.

Referring now to FIG. 16, an illustration of a configuration of the user interface 400 on the user device 140 is shown. As illustrated, the user interface 400 includes the camera graphical interface 402, the object 404, and the target icon 406. As illustrated, the camera of the user device 140 is directed toward a target user and the object 404 is the face of the target user. As an example, if the object 404 is the face of target user the projective action associated with the object

404 may be a transaction to send money from the user associated with the user device 140 to the target user.

Figure 17:
FIG. 17 is an illustration of a configuration of a graphical user interface generated by the image processing system of FIG. 1, according to example embodiments.

Referring now to FIG. 17, an illustration of a configuration of the user interface 400 on the user device 140 is shown. As illustrated, the user interface 400 includes the object element 408 and a plurality of the transaction actionable items 442. The object element 408 includes content related to the object 404. For example, if the object 404 is a face of a target user, the content included in the object element 408 may include an image of the target user, a name of the target user, a transaction history between the target user and the user associated with the user device 140 or other content associated with the target user. In some instances, if the object 404 is a face of a target user, the at least one processing circuit 114 may match the object 404 with a contact file of a contact list of the user device 140 and the object element 408 may include information from the contact file.

In some instances, the user may select each of the transaction actionable items 442 to initiate one of the prospective actions associated with the object 404. For example, when the object 404 is a face of a target user, a first of the transaction actionable items 442 (e.g., "Send money, etc.) may initiate a first of the prospective actions between the target user and the user associated with the user device 140 that includes the user sending an amount to the target user and a second of the transaction actionable items 442 (e.g., "Request money", etc.) may initiate a second of the prospective actions between the target user and the user associated with the user device 140 that includes the target user sending an amount to the user.

Figure 18:
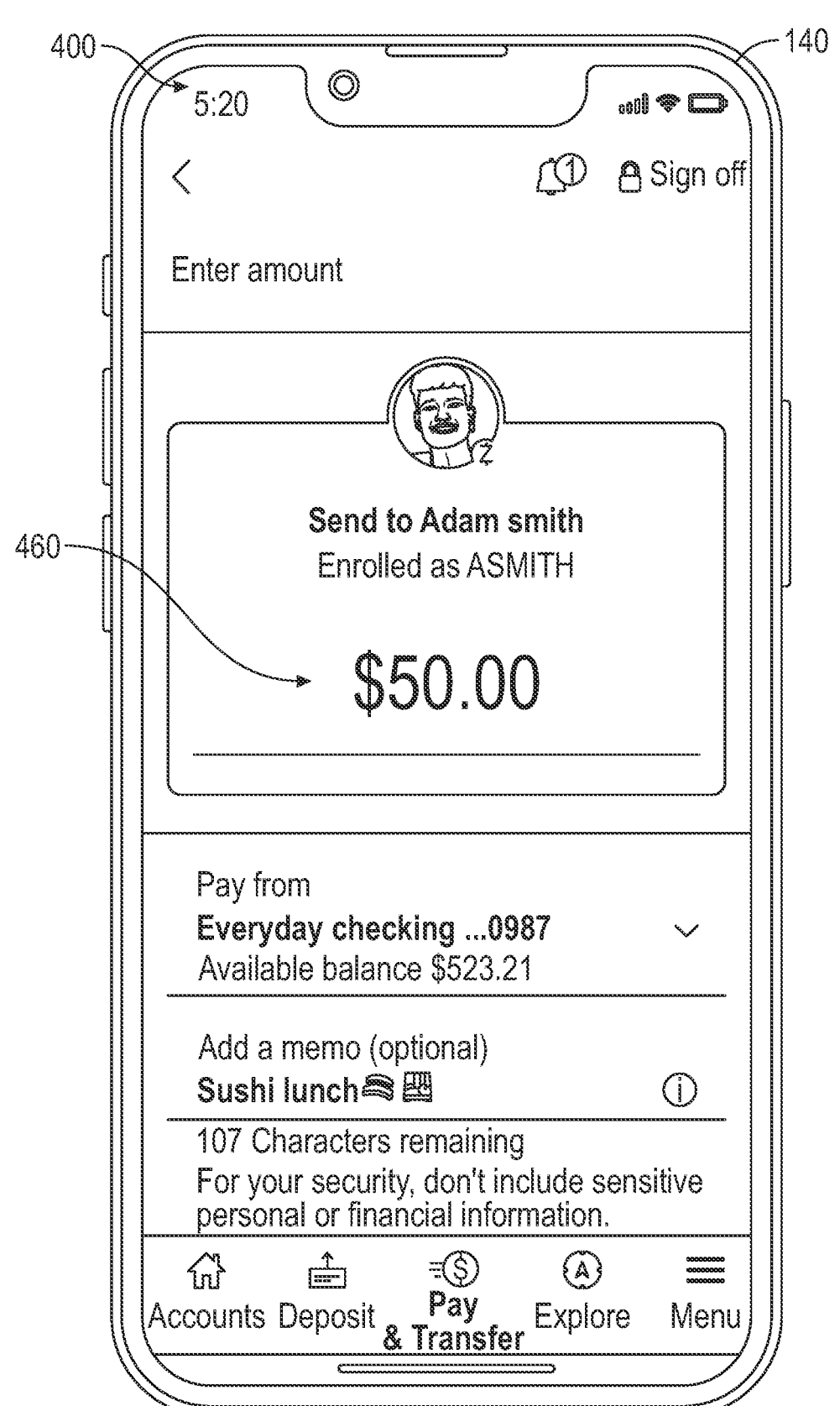
FIG. 18 is an illustration of a configuration of a graphical user interface generated by the image processing system of FIG. 1, according to example embodiments.

Referring now to FIG. 18, an illustration of a configuration of the user interface 400 on the user device 140 is shown. As illustrated, the user interface 400 includes a prospective action element 460. The prospective action element 460 may include content relating to the prospective action. For example, the prospective action element 460 may include content relating to an amount of the prospective action, information relating to the target user associated with the prospective action, information relating to the vendor associated with the prospective action, text relating to the prospective action, an indication of a transaction instrument associated with the prospective action, or other content relating to the prospective action. In some instances, the prospective action element 460 includes a confirmation actionable item that is configured to allow the at least one processing circuit 114 to facilitate the prospective action (e.g., to complete the prospective action, etc.).

It should be understood that no claim element herein is to be construed under the provisions of 35 U.S.C. § 112(f) unless the element is expressly recited using the phrase "means for."

As used herein, the term "circuitry" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuit, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may include or otherwise share the same processor which, in some example embodiments, may execute instructions stored, or otherwise accessed, via different areas of memory).

Alternatively, or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be provided as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud-based processor). Alternatively, or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud-based server). To that end, a "circuit" as described herein may include components that are distributed across one or more locations.

Example systems and devices in various embodiments might include a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions include, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick, or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the smart table system may be accomplished with standard programming techniques with rule-based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described to explain the principals of the disclosure and its practical application to enable one skilled in the art to utilize the various embodiments and with various modifications as are suited to the particular use contemplated. Other substitutions, modifications, changes, and omissions may be made in the design, operating conditions, and arrangement of the embodiments without departing from the scope of the present disclosure as expressed in the appended claims.

What is claimed is:

1. A provider computing system associated with a provider institution, the provider computing system comprising:
at least one processing circuit comprising at least one memory storing instructions therein that are executable by at least one processor, the at least one processing circuit configured to:
receive an indication of a log-in into a client application associated with the provider institution, wherein the log-in causes a launching of an image capture graphical user interface, wherein the client application is executed by a user device associated with a user;

acquire image data associated with an image obtained by an image acquisition device of the user device via the image capture graphical user interface of the client application and user data relating to the user associated with the user device, wherein the user data is stored by the client application and the image data is associated with at least one object depicted in the image;
determine, based on the image data, a prospective action associated with the at least one object, wherein the prospective action includes at least one action requirement related to completing the prospective action;
generate, based on comparing the at least one action requirement to the user data, action data specific to the user for satisfying the at least one action requirement to complete the prospective action; and
augment the image capture graphical user interface by including the action data, wherein augmenting the image capture graphical user interface overlays the action data specific to the user over the image data including the at least one object to provide simultaneous viewing of the at least one object with the action data specific to the user.

2. The provider computing system of claim 1, wherein:
prior to determining the prospective action associated with the at least one object, the at least one processing circuit is further configured to:
augment the image capture graphical user interface to overlay an intermediate element indicating data processing over the image data including the at least one object; and
the action data specific to the user replaces the intermediate element when the image capture graphical user interface is augmented to include the action data.

3. The provider computing system of claim 1, wherein the user data corresponds to a first action instrument and a second action instrument; and
wherein the at least one processing circuit is further configured to:
generate, based on modeling the first action instrument and the second action instrument with the prospective action, a first amount and a second amount associated with the prospective action, wherein the first amount corresponds to the first action instrument and the second amount corresponds to the second action instrument;
identify a variation between exchanging the second amount with the second action instrument during the prospective action and exchanging the first amount with the first action instrument during the prospective action;
generate, based on the variation, a value offset corresponding to the variation, wherein the value offset is a representation of exchanging the first amount with the first action instrument during the prospective action resulting in a higher value to the user than exchanging the second amount with the second action instrument during the prospective action; and
augment the image capture graphical user interface by including the value offset, wherein augmentation to the image capture graphical user interface overlays the value offset over the image data including the at least one object to provide simultaneous viewing of the at least one object with the value offset.

4. The provider computing system of claim 3, wherein:

the image capture graphical user interface further comprises an actionable item associated with the first action instrument; and in response to receiving a selection of the actionable item from the client application of the user device, the at least one processing circuit is further configured to:

acquire, from a merchant computing system, an action request corresponding to the first action instrument, wherein the action request comprises action information of the prospective action; and authorize the action request for the first amount.

5. The provider computing system of claim 1, wherein the at least one processing circuit is further configured to:

determine, based the action data, that an available amount for the prospective action corresponding to at least one action instrument of the user is below an action amount associated with the at least one action requirement;

perform, using the action data and the user data, a search for a sponsorship opportunity for the user corresponding to the prospective action, wherein the sponsorship opportunity would allow for the user to satisfy the at least one action requirement and complete the prospective action;

generate result data specific to the user for the search for the sponsorship opportunity, the result data comprising at least one prospective sponsor offering the sponsorship opportunity to the user to complete the prospective action; and augment the image capture graphical user interface by including the result data, wherein augmentation to the image capture graphical user interface overlays the result data over the image data including the at least one object to provide simultaneous viewing of the at least one object with the result data specific to the user.

6. The provider computing system of claim 5, wherein:

the image capture graphical user interface further comprises an actionable item associated with the sponsorship opportunity offered by the at least one prospective sponsor; and in response to receiving a selection of the actionable item from the user device, the at least one processing circuit is further configured to:

facilitate, based on the result data, an action associated with the sponsorship opportunity between the user and the at least one prospective sponsor corresponding to the prospective action.

7. The provider computing system of claim 1, wherein during the step of acquiring the image data associated with the image, the at least one processing circuit is further configured to:

identify, using an object detection technique, the at least one object depicted in the image; and generate the image data by associating the at least one object with object data stored by the provider computing system.

8. The provider computing system of claim 1, wherein prior to determining the prospective action associated with the at least one object, the at least one processing circuit is further configured to:

provide the image data to an application programing interface (API) of a merchant computing system of a merchant corresponding to the at least one object;

acquire merchant data from the API of the merchant computing system, the merchant data associated with the at least one object; and incorporate the merchant data into the image data, such that the merchant data is used by the at least one processing circuit to determine the prospective action that may be completed by the user.

9. The provider computing system of claim 8, wherein:

the augmentation to the image capture graphical user interface further overlays the merchant data over the image data including the at least one object to provide simultaneous viewing of the at least one object with the merchant data actuated from the merchant computing system.

10. A method comprising:

receiving, by at least one processing circuit, an indication of a log-in into a client application associated with a provider institution, wherein the log-in causes a launching of an image capture graphical user interface, wherein the client application is executed by a user device associated with a user;

acquiring image data associated with an image obtained by an image acquisition device of the user device via the image capture graphical user interface of the client application and user data relating to the user associated with the user device, wherein the user data is stored by the client application and the image data is associated with at least one object depicted in the image;

determining, based on the image data, a prospective action associated with the at least one object, wherein the prospective action includes at least one action requirement related to completing the prospective action;

generating, based on comparing the at least one action requirement to the user data, action data specific to the user for satisfying the at least one action requirement to complete the prospective action; and augmenting the image capture graphical user interface by including the action data, wherein augmenting the image capture graphical user interface overlays the action data specific to the user over the image data including the at least one object to provide simultaneous viewing of the at least one object with the action data specific to the user.

11. The method of claim 10, wherein:

prior to determining the prospective action associated with the at least one object, the method further comprises:

augmenting the image capture graphical user interface to overlay an intermediate element indicating data processing over the image data including the at least one object; and the action data specific to the user replaces the intermediate element when the image capture graphical user interface is augmented to include the action data.

12. The method of claim 10, wherein the user data corresponds to a first action instrument and a second action instrument; and wherein the method further comprises:

generating, based on modeling the first action instrument and the second action instrument with the prospective action, a first amount and a second amount associated with the prospective action, wherein the first amount corresponds to the first action instrument and the second amount corresponds to the second action instrument;

identifying a variation between exchanging the second amount with the second action instrument during the prospective action and exchanging the first amount with the first action instrument during the prospective action;

generating, based on the variation, a value offset corresponding to the variation, wherein the value offset is a representation of exchanging the first amount with the first action instrument during the prospective action resulting in a higher value to the user than exchanging the second amount with the second action instrument during the prospective action; and augmenting the image capture graphical user interface by including the value offset, wherein augmentation to the image capture graphical user interface overlays the value offset over the image data including the at least one object to provide simultaneous viewing of the at least one object with the value offset.

13. The method of claim 12, wherein:

the image capture graphical user interface further comprises an actionable item associated with the first action instrument; and the method further comprises:

receiving a selection of the actionable item from the client application of the user device;

acquiring, from a merchant computing system, an action request corresponding to the first action instrument, wherein the action request comprises action information of the prospective action; and authorizing the action request for the first amount.

14. The method of claim 10, further comprising:

determining, based the action data, that an available amount for the prospective action corresponding to at least one action instrument of the user is below an action amount associated with the at least one action requirement;

performing, using the action data and the user data, a search for a sponsorship opportunity for the user corresponding to the prospective action, wherein the sponsorship opportunity would allow for the user to satisfy the at least one action requirement and complete the prospective action;

generating result data specific to the user for the search for the sponsorship opportunity, the result data comprising at least one prospective sponsor offering the sponsorship opportunity to the user to complete the prospective action; and augmenting the image capture graphical user interface by including the result data, wherein augmentation to the image capture graphical user interface overlays the result data over the image data including the at least one object to provide simultaneous viewing of the at least one object with the result data specific to the user.

15. The method of claim 14, wherein:

the image capture graphical user interface further comprises an actionable item associated with the sponsorship opportunity offered by the at least one prospective sponsor; and the method further comprises:

receiving a selection of the actionable item from the client application of the user device; and facilitating, based on the result data, an action associated with the sponsorship opportunity between the user and the at least one prospective sponsor corresponding to the prospective action.

16. The method of claim 10, wherein during the step of acquiring the image data associated with the image, the method further comprises:

identifying, using an object detection technique, the at least one object depicted in the image; and generating the image data by associating the at least one object with object data stored by the at least one processing circuit.

17. The method of claim 10, wherein:

prior to determining the prospective action associated with the at least one object, the method further comprises:

providing the image data to an application programing interface (API) of a merchant computing system of a merchant corresponding to the at least one object;

acquiring merchant data from the API of the merchant computing system, the merchant data associated with the at least one object; and incorporating the merchant data into the image data, such that the merchant data is used by the at least one processing circuit to determine the prospective action that may be completed by the user; and the augmentation to the image capture graphical user interface further overlays the merchant data over the image data including the at least one object to provide simultaneous viewing of the at least one object with the merchant data actuated from the merchant computing system.

18. A non-transitory computer-readable storage medium having instructions stored thereon that, when executed by at least one processing circuit, cause the at least one processing circuit to perform operations comprising:

receiving an indication of a log-in into a client application associated with a provider institution, wherein the log-in causes a launching of an image capture graphical user interface, wherein the client application is executed by a user device associated with a user;

acquiring image data associated with an image obtained by an image acquisition device of the user device via the image capture graphical user interface of the client application and user data relating to the user associated with the user device, wherein the user data is stored by the client application and the image data is associated with at least one object depicted in the image;

determining, based on the image data, a prospective action associated with the at least one object, wherein the prospective action includes at least one action requirement related to completing the prospective action;

generating, based on comparing the at least one action requirement to the user data, action data specific to the user for satisfying the at least one action requirement to complete the prospective action; and augmenting the image capture graphical user interface by including the action data, wherein augmenting the image capture graphical user interface overlays the action data specific to the user over the image data including the at least one object to provide simultaneous viewing of the at least one object with the action data specific to the user.

19. The non-transitory computer-readable storage medium of claim 18, wherein the user data corresponds to a first action instrument and a second action instrument; and wherein the operations further comprise:

generating, based on modeling the first action instrument and the second action instrument with the prospective action, a first amount and a second amount associated with the prospective action, wherein the first amount corresponds to the first action instrument and the second amount corresponds to the second action instrument;

identifying a variation between exchanging the second amount with the second action instrument during the prospective action and exchanging the first amount with the first action instrument during the prospective action;

generating, based on the variation, a value offset corresponding to the variation, wherein the value offset is a representation of exchanging the first amount with the first action instrument during the prospective action resulting in a higher value to the user than exchanging the second amount with the second action instrument during the prospective action; and augmenting the image capture graphical user interface by including the value offset, wherein augmentation to the image capture graphical user interface overlays the value offset over the image data including the at least one object to provide simultaneous viewing of the at least one object with the value offset.

20. The non-transitory computer-readable storage medium of claim 18, wherein:

prior to determining the prospective action associated with the at least one object, the operations further comprise:

providing the image data to an application programing interface (API) of a merchant computing system of a merchant corresponding to the at least one object;

acquiring merchant data from the API of the merchant computing system, the merchant data associated with the at least one object; and incorporating the merchant data into the image data, such that the merchant data is used by the at least one processing circuit to determine the prospective action that may be completed by the user; and the augmentation to the image capture graphical user interface further overlays the merchant data over the image data including the at least one object to provide simultaneous viewing of the at least one object with the merchant data actuated from the merchant computing system.

* * * * *